US012591497B1

(12) United States Patent
Kumar et al.

(10) Patent No.: US 12,591,497 B1
(45) Date of Patent: Mar. 31, 2026

(54) INTELLIGENT PROFILE-DRIVEN DRIFT DETECTION

(71) Applicant: Oracle International Corporation, Redwood Shores, CA (US)

(72) Inventors: Gaurav Kumar, Bangalore (IN); Prashant Kumar, Bengaluru (IN); Nagarajan Muthukrishnan, Foster City, CA (US); Prasanna Venkatesh Ramamurthi, Chennai (IN); Binoy Sukumaran, Foster City, CA (US); Nirmala Sreekantaiah, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/901,506

(22) Filed: Sep. 30, 2024

(51) Int. Cl.
 *G06F 11/30* (2006.01)
(52) U.S. Cl.
 CPC ...... *G06F 11/3051* (2013.01); *G06F 11/3006* (2013.01)
(58) Field of Classification Search
 CPC .......................... G06F 11/3051; G06F 11/3006
 USPC ........................................................ 714/1, 3
 See application file for complete search history.

(56) References Cited

U.S. PATENT DOCUMENTS

| | | | |
|---|---|---|---|
| 6,363,495 | B1 | 3/2002 | Mackenzie et al. |
| 6,801,937 | B1 | 10/2004 | Novaes et al. |
| 7,020,695 | B1 | 3/2006 | Kundu et al. |
| 7,711,121 | B2 | 5/2010 | Hunt et al. |
| 7,739,143 | B1 | 6/2010 | Dwarakanath et al. |
| 7,739,284 | B2 | 6/2010 | Aggarwal et al. |
| 7,783,510 | B1 | 8/2010 | Gilgur et al. |

(Continued)

FOREIGN PATENT DOCUMENTS

| | | |
|---|---|---|
| CN | 103907091 A | 7/2014 |
| CN | 104904161 A | 9/2015 |

(Continued)

OTHER PUBLICATIONS

Berral et al., "Power-aware Multi-DataCenter Management using Machine Learning," IEEE, 2013, 10pg. (Year: 2013).

(Continued)

*Primary Examiner* — Chae M Ko
(74) *Attorney, Agent, or Firm* — Invoke

(57) ABSTRACT

Techniques are disclosed for detecting a drift experienced by computing system(s). The system generates multiple snapshots as part of a drift detection process. Each snapshot contains state information of a computing system. Based on the snapshots, the system generates metrics sets according to a general specification. The general specification defines metrics generally suitable for detecting drift in the computing system(s). Based on the circumstances of the drift detection process, the system generates a custom specification. The system optionally employs trained machine learning model(s) for custom specification generation. The custom specification defines modifications to the metric sets designed to make the metric sets more suitable for the circumstances of the drift detection process. The system modifies the metric sets according to the custom specification. Subsequently, the system generates flattened vectors based on the modified metric sets, and the system performs a cluster analysis on the flattened vectors to detect any drift.

20 Claims, 12 Drawing Sheets

(56) References Cited

U.S. PATENT DOCUMENTS

| | | | |
|---|---|---|---|
| 7,987,106 | B1 | 7/2011 | Aykin |
| 8,200,454 | B2 | 6/2012 | Dorneich et al. |
| 8,229,876 | B2 | 7/2012 | Roychowdhury |
| 8,234,236 | B2 | 7/2012 | Beaty et al. |
| 8,261,295 | B1 | 9/2012 | Risbood et al. |
| 8,363,961 | B1 | 1/2013 | Avidan et al. |
| 8,576,964 | B2 | 11/2013 | Taniguchi et al. |
| 8,583,649 | B2 | 11/2013 | Ailon et al. |
| 8,635,328 | B2 | 1/2014 | Corley et al. |
| 8,694,969 | B2 | 4/2014 | Bernardini et al. |
| 8,880,525 | B2 | 11/2014 | Galle et al. |
| 9,053,171 | B2 | 6/2015 | Ailon et al. |
| 9,147,167 | B2 | 9/2015 | Urmanov et al. |
| 9,265,859 | B2 | 2/2016 | Gibson et al. |
| 9,330,119 | B2 | 5/2016 | Chan et al. |
| 9,355,357 | B2 | 5/2016 | Hao et al. |
| 9,420,513 | B1 | 8/2016 | Yalagandula et al. |
| 9,495,395 | B2 | 11/2016 | Chan et al. |
| 9,514,213 | B2 | 12/2016 | Wood et al. |
| 9,692,662 | B2 | 6/2017 | Chan et al. |
| 9,710,493 | B2 | 7/2017 | Wang et al. |
| 10,496,926 | B2 | 12/2019 | Florissi et al. |
| 10,756,968 | B2 * | 8/2020 | Johnson ............... H04L 41/0894 |
| 10,936,376 | B2 | 3/2021 | Gong et al. |
| 2003/0224344 | A1 | 12/2003 | Shamir et al. |
| 2004/0122797 | A1 | 6/2004 | Mishra et al. |
| 2005/0278445 | A1 | 12/2005 | Quang et al. |
| 2005/0289538 | A1 | 12/2005 | Black-Ziegelbein et al. |
| 2007/0050497 | A1 | 3/2007 | Haley et al. |
| 2009/0282133 | A1 | 11/2009 | Walker et al. |
| 2009/0316699 | A1 | 12/2009 | Mark et al. |
| 2010/0027552 | A1 | 2/2010 | Hill |
| 2011/0040575 | A1 | 2/2011 | Wright et al. |
| 2011/0125894 | A1 | 5/2011 | Anderson et al. |
| 2011/0126197 | A1 | 5/2011 | Larsen et al. |
| 2011/0126275 | A1 | 5/2011 | Anderson et al. |
| 2011/0231508 | A1 | 9/2011 | Torii |
| 2012/0254183 | A1 | 10/2012 | Ailon et al. |
| 2013/0204948 | A1 | 8/2013 | Zeyliger et al. |
| 2013/0326202 | A1 | 12/2013 | Rosenthal et al. |
| 2014/0067757 | A1 | 3/2014 | Ailon et al. |
| 2014/0189686 | A1 | 7/2014 | Masters et al. |
| 2014/0280886 | A1 | 9/2014 | Burns |
| 2014/0282413 | A1 | 9/2014 | Grimme et al. |
| 2014/0379717 | A1 | 12/2014 | Urmanov et al. |
| 2015/0039735 | A1 | 2/2015 | Zeyliger et al. |
| 2015/0248446 | A1 | 9/2015 | Nordstrom et al. |
| 2016/0067864 | A1 | 3/2016 | Mullan et al. |
| 2016/0105544 | A1 | 4/2016 | Liu et al. |
| 2016/0110657 | A1 | 4/2016 | Gibiansky et al. |
| 2016/0283533 | A1 | 9/2016 | Urmanov et al. |
| 2016/0299961 | A1 | 10/2016 | Olsen |
| 2016/0314184 | A1 | 10/2016 | Bendersky et al. |
| 2016/0314402 | A1 | 10/2016 | Buccapatnam et al. |
| 2016/0359740 | A1 | 12/2016 | Parandehgheibi et al. |
| 2022/0350791 | A1 * | 11/2022 | Sloane ................ G06F 11/1451 |
| 2023/0254210 | A1 * | 8/2023 | Mangalam .............. H04L 67/34 |
| | | | 709/220 |
| 2023/0342179 | A1 * | 10/2023 | Suttle ................. H04L 41/0894 |
| 2024/0039916 | A1 * | 2/2024 | McPeak .................. G06F 3/067 |
| 2024/0305583 | A1 * | 9/2024 | Naylor ................... H04L 41/40 |

FOREIGN PATENT DOCUMENTS

| | | | | |
|---|---|---|---|---|
| CN | 117076270 A | * | 11/2023 | .......... G06F 11/3409 |
| WO | 2011/071624 A2 | | 6/2011 | |
| WO | 2011/102891 A1 | | 8/2011 | |
| WO | 2011/151500 A1 | | 12/2011 | |
| WO | 2013/016584 A1 | | 1/2013 | |
| WO | 2017/123683 A1 | | 7/2017 | |

OTHER PUBLICATIONS

Chiang et al., "Matrix: Achieving Predictable Virtual Machine Performance in the Clouds," USENIX, 2014, 13pg. (Year: 2014).

Davies, David L., et al., "A Cluster Separation measure", IEEE Transactions on Pattern Analysis and Machine Intelligence, vol. PAMI-1, No. 2, Apr. 1979, pp. 224-227.

Eyers et al., "Configuring large-scale storage using a middleware with machine learning," Wiley, 2011, 15pg. (Year: 2011).

Ham et al., "Interactive Visualization of Small World Graphs", INFOVIS '04 Proceedings of the IEEE Symposium on Information Visualization, 2004, pp. 199-206.

Haugen et al., "Extracting Common Time Trends from Concurrent Time Series: Maximum Autocorrelation Factors with Applications", Stanford University, Oct. 20, 2015, pp. 1-38.

Huang, Z. (1997), "A fast clustering algorithm to cluster very large categorical data sets in data mining", Proceedings of the SIGMOD Workshop on Research Issues on Data Mining and Knowledge Discovery, Dept. of Computer Science, The University of British Columbia, Canada, pp. 1-8.

Jarvis, R. A., et al., "Clustering Using a Similarity Measure Based on Shared Neighbors", IEEE Transactions on Computers, vol. C-22, No. 11, Nov. 1973, pp. 1025-1034.

Maarek Y. S., "On the Use of Cluster Analysis for Assisting Maintenance of Large Software Systems", Computer Systems and Software Engineering, 1988 Proceedings, The Third Israel Conference on Computer Systems and Software Engineering 1988, pp. 178-186.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Sidhanta et al., "Infra: SLO Aware Elastic Auto Scaling in the Cloud for Cost Reduction," IEEE, 2016, 8pg. (Year: 2016).

Slipetskyy, Rostyslav, "Security Issues in OpenStack", Master's Thesis, Technical University of Denmark, Jun. 2011, 90 pages.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Taylor J W et al: "Forecasting intraday time series with multiple seasonal cycles using parsimonious seasonal exponential smoothing", Omega, vol. 40, No. 6, Dec. 2012 (2012-12), pp. 748-757.

Tibshirani, Robert, Guenther Walther, & Trevor Hastie (2001), "Estimating the number of clusters in a data set via the gap statistic", Journal of the Royal Statistical Society B, vol. 63, Part 2, pp. 411∧23:2001.

Voras et al., "Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.

Witten, Daniela M. & Robert Tibshirani (2010), "A framework for feature selection in clustering", Journal of the American Statistical Association, vol. 105, No. 490, pp. 713-726:2010.

* cited by examiner

Generate snapshots of target system(s).
702

Obtain a general specification for metric set generation.
704

Based on the snapshots and the general specification, generate metric sets for the target system(s).
706

Aggregate the metric sets for further processing.
708

Group the vectors into clusters.
902

Determine a target vector for each cluster.
904

Analyze the clusters for signs of drift impacting the target system(s).
906

Perform a fine-grain drift analysis focused on one or more target system(s).
908

Present the results of the drift detection process to a user and/or remediate drift.
910

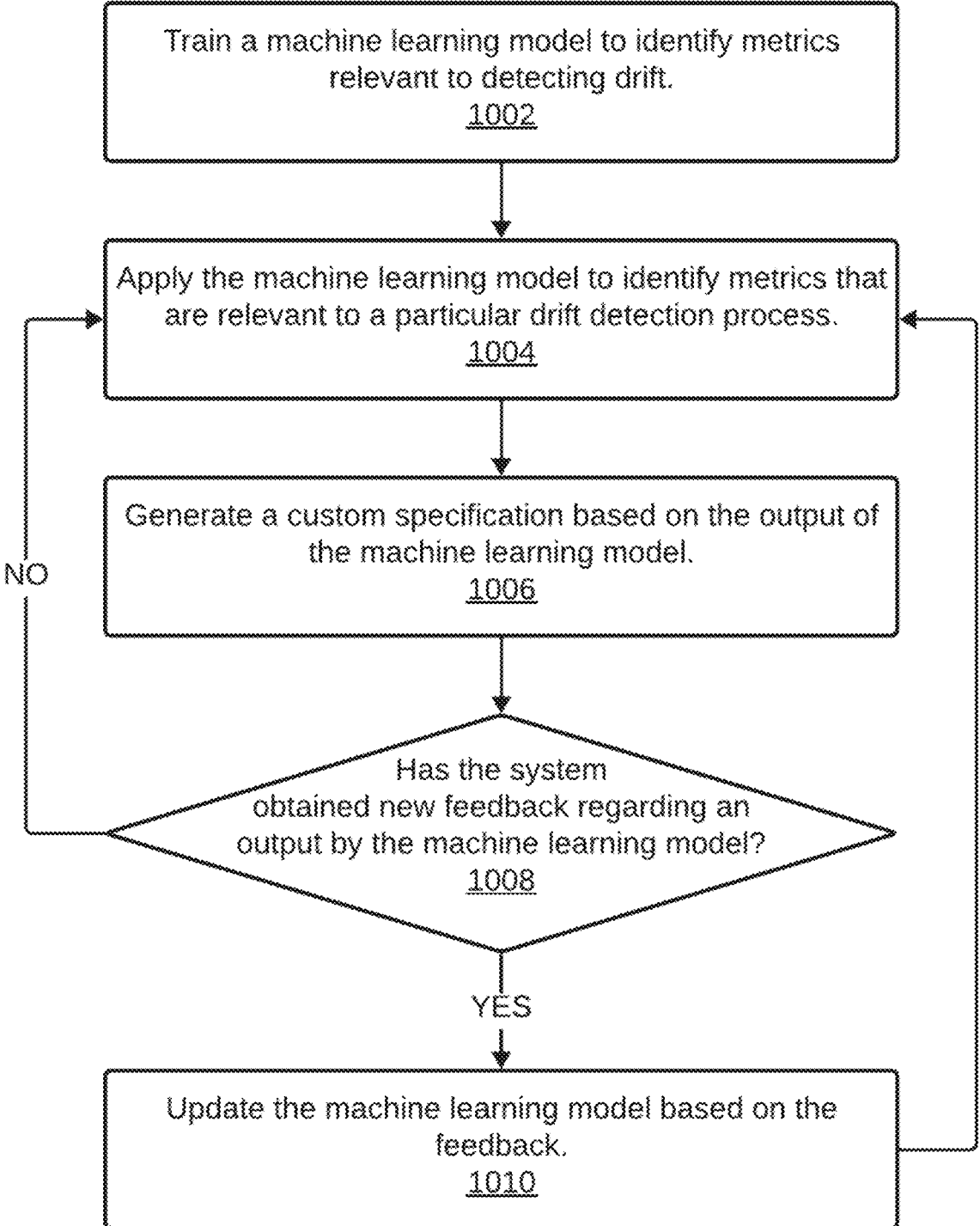

Train a machine learning model to identify metrics relevant to detecting drift.
1002

Apply the machine learning model to identify metrics that are relevant to a particular drift detection process.
1004

Generate a custom specification based on the output of the machine learning model.
1006

Has the system obtained new feedback regarding an output by the machine learning model?
1008

NO

YES

Update the machine learning model based on the feedback.
1010

FIG. 10

INTELLIGENT PROFILE-DRIVEN DRIFT DETECTION

TECHNICAL FIELD

The present disclosure relates to detecting drift in computing systems.

BACKGROUND

The state of a computing system may drift from a target state. Typical manifestations of drift include irregular resource configuration, irregular resource allocation, irregular resource utilization, and/or irregular resource state. Drift may impact software resources, hardware resources, and/or resources that combine software and hardware. Drift is often associated with performance degradation, configuration errors, security breaches, and/or various other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and they mean at least one. In the drawings:

FIG. 10 illustrates an example set of operations for training a machine learning model in accordance with one or more embodiments;

DETAILED DESCRIPTION

Figure 1:
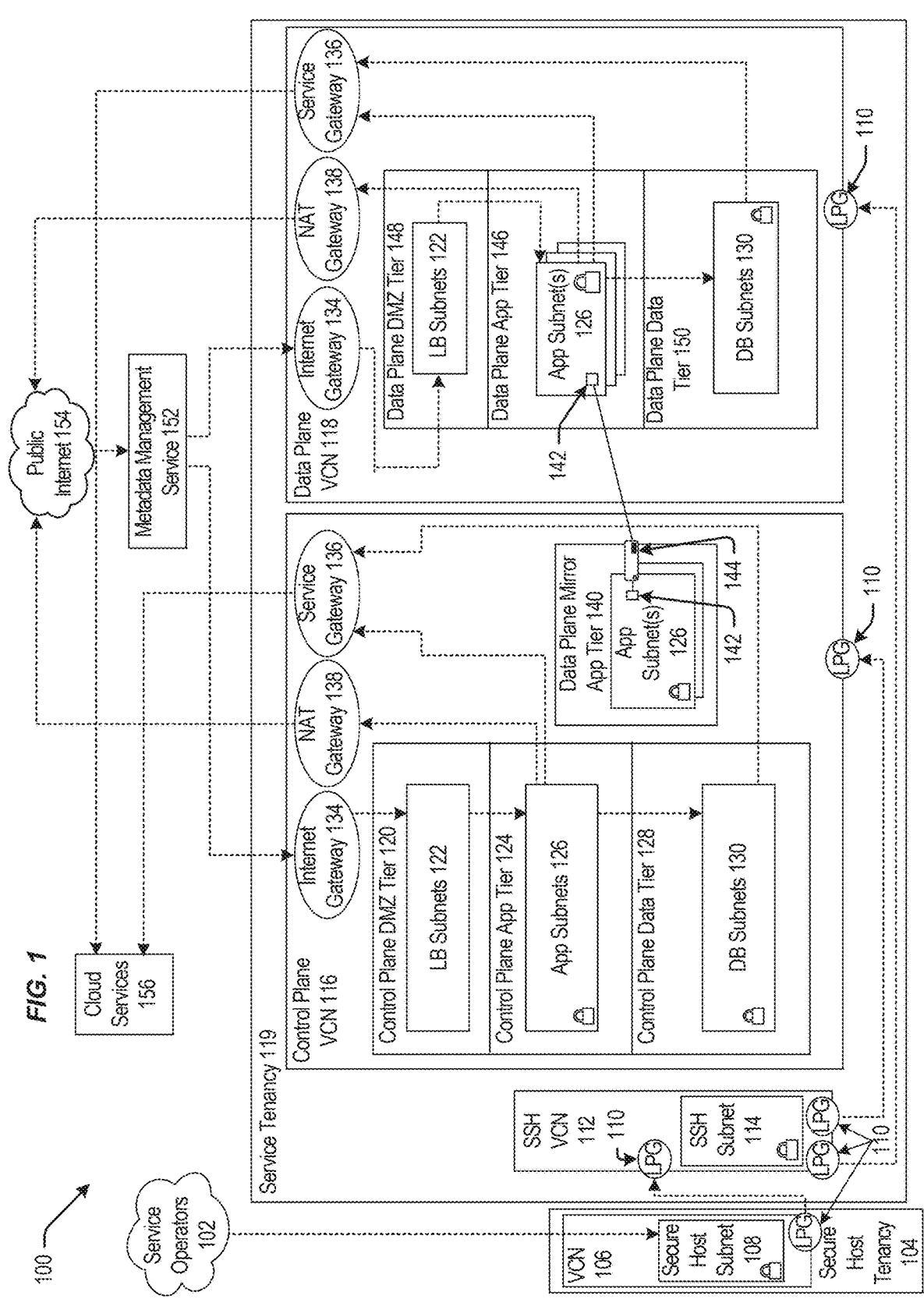
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

The following table of contents is provided for the reader's convenience and is not intended to define the limits of this disclosure.

1. GENERAL OVERVIEW
2. CLOUD COMPUTING TECHNOLOGY
3. COMPUTER SYSTEM
4. DRIFT DETECTION SYSTEM
5. PERFORMING A DRIFT DETECTION PROCESS
   5.1 COLLECTING STATE INFORMATION
   5.2 PROCESSING METRIC SETS
   5.3 PERFORMING A DRIFT ANALYSIS
6. MACHINE LEARNING FOR DRIFT DETECTION
7. EXAMPLE EMBODIMENT
   7.1 EXAMPLE DRIFT DETECTION ARCHITECTURE
   7.2 EXAMPLE METRIC SET
8. MISCELLANEOUS; EXTENSIONS

1. General Overview

One or more embodiments collect state information from computing systems subjected to a drift detection process, generate metric sets for drift detection based on the collected state information, modify the metric sets to better suit the circumstances of the drift detection process, generate flattened vectors based on the modified metrics sets, group the flattened vectors into clusters, and analyze the clusters to detect any drift experienced by the computing systems.

To identify a drift experienced by any given computing system, an embodiment collects state information from a group of computing systems that includes the given computing system. An example group of computing systems includes computing systems that might generally be expected to have similar states if each computing system is operating as intended. Additionally, or alternatively, the system collects state information of the given computing system over a period of time.

To collect state information for a drift detection process, an embodiment generates at least one snapshot of each computing system that is a subject of the drift detection process. Further, over the course of the drift detection process, the system may regularly generate snapshots of each computing system. In an example, the system generates and maintains the snapshots within the computing environment(s) of the computing system(s). Note that (a) only a portion of the information included in the snapshots may be relevant to the drift detection process and (b) the snapshots may include sensitive information that the system is prohibited from harvesting.

An embodiment generates a metric set to represent each computing system that is being subjected to a drift detection process. The metric sets are generated based on snapshots of the computing system(s). Each metric set is generated according to a general specification for generating metric sets. The general specification defines metrics that are generally relevant to detecting drift. An example metric set indicates resource configuration in a computing system, resource allocation in the computing system, resource utilization in the computing system, and/or other information pertaining to the state of the computing system.

An embodiment generates metric sets that contain categories of metric(s). Each category of metric(s) characterizes a particular aspect of a computing system. For example, a metric set may contain a CPU category, a memory category, a databases category, an applications category, a processes category, a NUMA category, an IO category, a custom category, and/or other categories of metric(s).

Accordingly, each of these aspects of the computing system may be represented in a drift detection process by one or more fixed dimensions. The metrics included in each of these categories may be predefined in the general specification.

An embodiment generates metric sets that represents both (a) quantitative attributes of computing systems and (b) qualitative attributes of computing systems. Quantitative attributes are represented in the metric sets by numerical statistics. Qualitative attributes of the computing systems are represented in the metric sets by digital signatures (e.g., hashes). In an example, each digital signature is expressed numerically.

An embodiment generates metric sets representing computing system(s) such that no sensitive information associated with the computing system(s) is revealed in the metric sets. As an example, assume that a snapshot of a computing system contains sensitive information that is relevant to a drift detection process. In this example, the system applies one or more hashing algorithms to the sensitive information, and the hashing algorithm(s) output one or more hash values based on the sensitive information. The hash value(s) are included in the metric set to represent the sensitive information. At the same time, the sensitive information cannot be derived based only on the hash value(s). In this example, the metric set is generated in the computing system's computing environment; however, once generated, the metric set can be extracted from the computing system's computing environment without concern of running afoul of any restriction on harvesting the sensitive information. The system may collect each of the metric sets generated for a drift detection process within a central data repository. Once the metric sets have been aggregated, the system proceeds in further processing the metric sets.

An embodiment generates a custom specification for modifying metric sets that are the subject of a drift detection process. The system generates the custom specification to suit the circumstances of the drift detection process. Example information that may be a basis for generating the custom specification includes attributes of computing systems, user characteristics of entities associated with computing systems, user characteristics of an entity that initiates the particular drift detection process, historical data, user input, and/or other information. The system may generate the custom specification based, at least in part, on the output of one or more trained machine learning models.

An embodiment trains a machine learning model to select relevant metrics for detecting drift. The system trains the machine learning model with training data. An example set of training data defines an association between (a) a particular circumstance of a drift detection process and (b) a set of one or more metrics that are relevant to detecting drift if the particular circumstance exists.

An embodiment applies a machine learning model to the circumstances of a particular drift detection process, and the machine learning model outputs a set of metrics that are potentially relevant to detecting drift. The system then generates a custom specification based, at least in part, on the output of the machine learning model. If the system receives feedback that relates to the output of the machine learning model, the system further trains the machine learning model based on the feedback.

An embodiment modifies metric sets in accordance with a custom specification. The custom specification proscribes modifications to the metric sets that are intended to make the metric sets more suitable for detecting drift in the circumstances of a drift detection process. Modifying the metric sets in accordance with the custom specification may entail scaling metric(s) within the metric set relative to other metrics in the metric set. For example, any given metric within the metric set may be scaled upwards or downwards such that the given metric can be expected to have a greater or lesser influence on a forthcoming analysis. If scaling is applied to the metric set, scaling is applied to a single metric within the metric set, or scaling is applied to multiple metrics within the metric set. If scaling is applied to multiple metrics within the metric set, uniform scaling is applied to the multiple metrics, or nonuniform scaling is applied to the multiple metrics. In an example of the latter scenario, the multiple metrics are scaled by differing amounts, and/or the multiple metrics are scaled in differing directions.

An embodiment generates flattened vectors based on metric sets. To this end, the system normalizes the values included in the metric sets. Values may be normalized across all metrics sets of all computing systems that are being subjected to a drift detection process. Each value within each metric set may be normalized within a given range such that meaningful comparisons can be made between computing systems of differing scales and complexities. Based on the normalized values in the metric sets, the system determines dimensions of flattened vectors. The system generates one or more flattened vectors to represent each computing system that is being subjected to the drift detection process.

An embodiment performs a cluster analysis to detect drift in computing systems. To this end, the system groups flattened vectors into cluster(s) by applying one or more clustering algorithms. Once the flattened vectors have been clustered, the system evaluates the cluster(s) for indications of drift.

While analyzing a cluster of flattened vectors that represents a group of computing systems, an embodiment detects a drift experienced by a particular computing system based, at least in part, on identifying an inconsistency in how the particular computing system's resources are configured, allocated, and/or utilized relative to other computing systems in the group. Having detected the drift, the system may map the drift to the specific resources of the particular computing system that are associated with the drift.

While analyzing a cluster of flattened vectors that represents the progression of a particular computing system's state over a period of time, an embodiment detects the drift experienced by the particular computing system based, at least in part, on observing a change in how the particular target system's resources are configured, allocated, and/or utilized over the period of time.

While analyzing a cluster of flattened vectors that represents a group of computing systems, an embodiment detects a drift that impacts multiple computing systems in the group. The system detects the drift by finding inconsistencies between the states of the multiple computing systems and the other computing systems in the group, and/or the system identifies the drift by finding patterns of irregularity in the states of the multiple computing systems impacted by the misconfigured fleet setting.

An embodiment is configured to detect drift that impacts a fleet of resources. For example, the system is configured to detect a drift impacting a fleet of virtual machines, applications, database instances, etc.

An embodiment is configured to detect drift in computing systems that are cooperatively managed by multiple entities. For example, the system is configured to detect a drift impacting a cloud computing system that is cooperatively managed by a cloud user, a cloud provider, and/or a cloud vendor. Note that, in this example, the cloud provider and the cloud vendor may be a single entity or separate entities depending on the application.

An embodiment performs a fine grain analysis after an initial cluster analysis. The fine grain analysis evaluates a subset of the computing systems involved in the initial cluster analysis. The system evaluates the subset of computing systems based on more detailed information than the information considered by the initial cluster analysis. For example, the system may generate a more detailed set of metrics for each computing system in the subset of computing systems.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud provider can host the infrastructure components (e.g., servers, storage devices, network nodes (e.g., hardware), target system software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS target system is the process of implementing a new application, or a new version of an application, onto a prepared application server or other similar device. IaaS target system may also include the process of preparing the server (e.g., installing libraries, daemons, etc.). The target system process is often managed by the cloud provider below the hypervisor layer (e.g., the servers, storage, network hardware, and virtualization). Thus, the customer may be responsible for handling (OS), middleware, and/or application target system, such as on self-service virtual machines. The self-service virtual machines can be spun up on demand.

In some examples, IaaS provisioning may refer to acquiring computers or virtual hosts for use, even installing needed libraries or services on them. In most cases, target system does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous target system techniques may be employed to enable target system of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to target system of code to be executed on the infrastructure. However, in some examples, the infrastructure that will deploy the code may first be set up. In some instances, the provisioning can be done manually, a provisioning tool may be utilized to provision the resources, and/or target system tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the P a e 11 control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
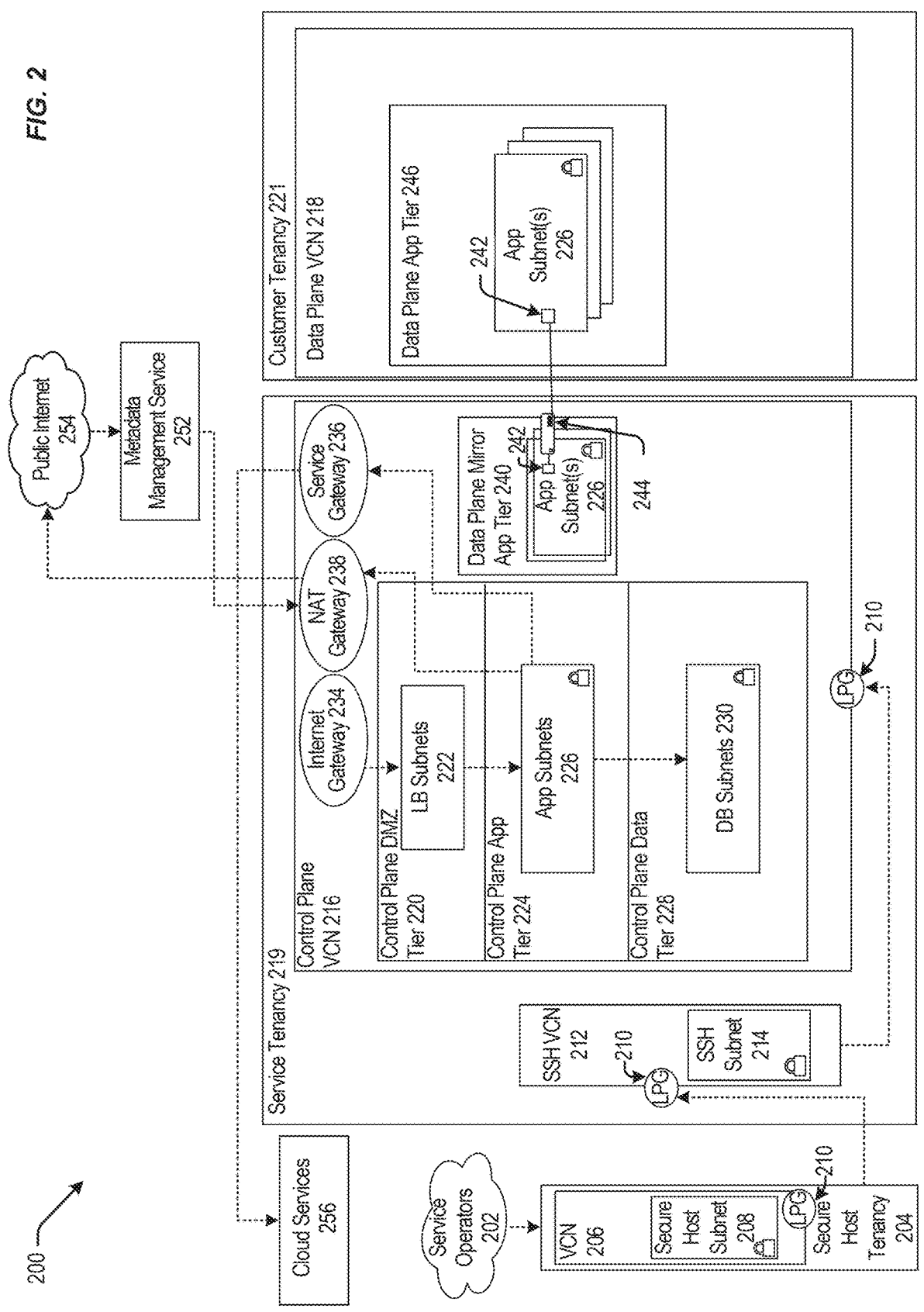

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired target system or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Target system 1" may be located in Region 1 and in "Region 2." If a call to Target system 1 is made by the service gateway 236 contained in the control plane VCN 216 located in Region 1, the call may be transmitted to Target system 1 in Region 1. In this example, the control plane VCN 216, or Target system 1 in Region 1, may not be communicatively coupled to, or otherwise in communication with, Target system 1 in Region 2.

Figure 3:
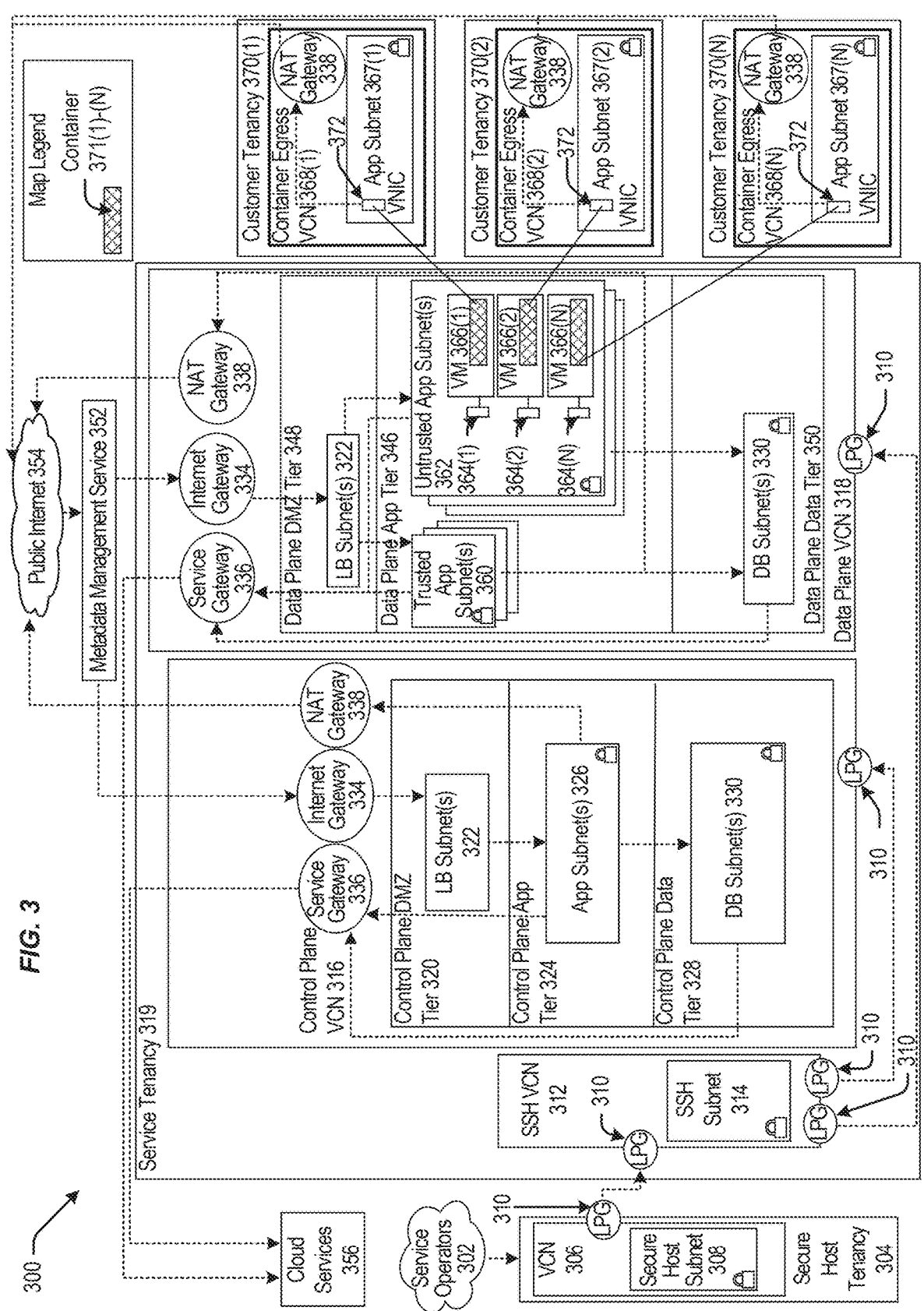

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
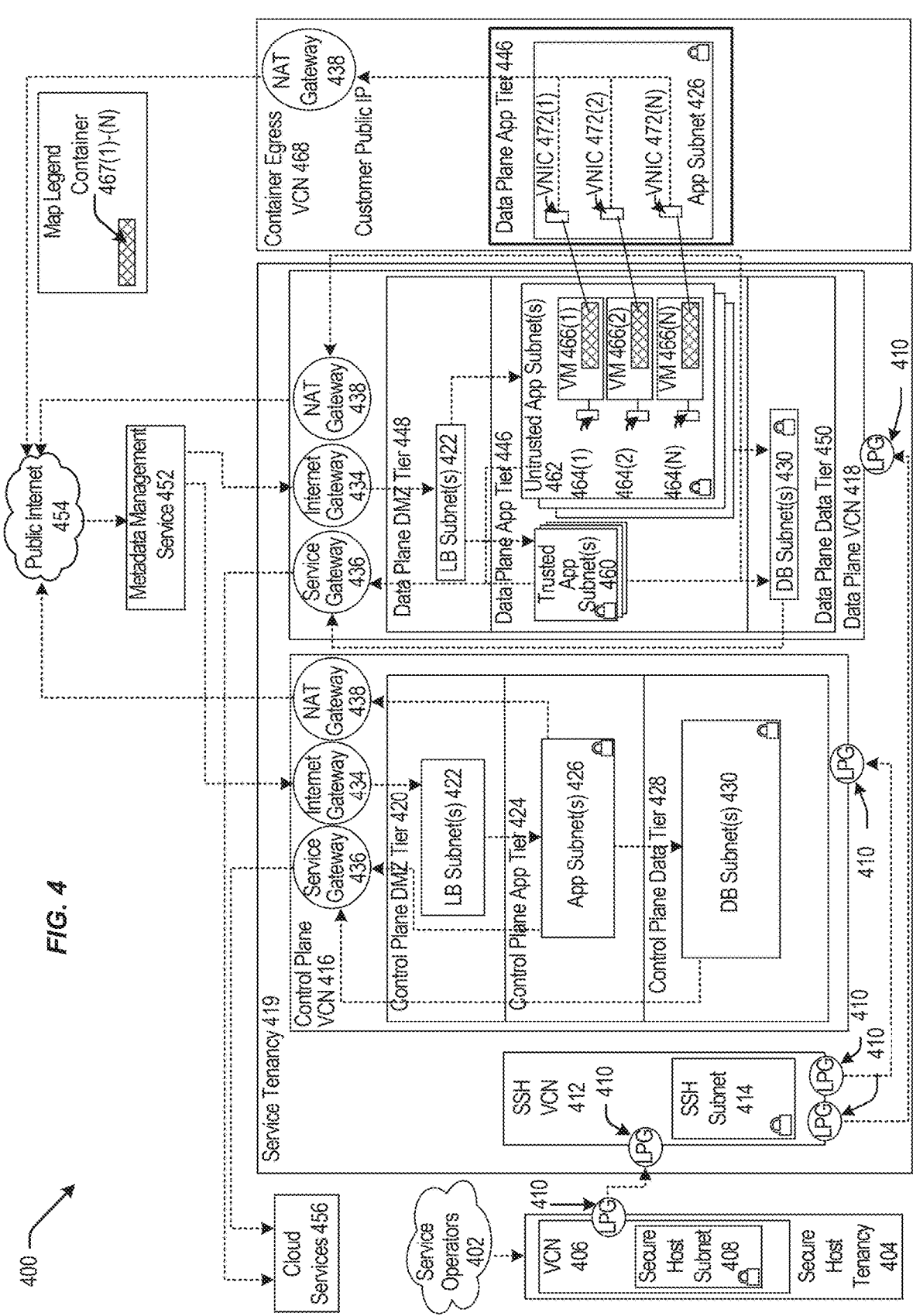

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various target system models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
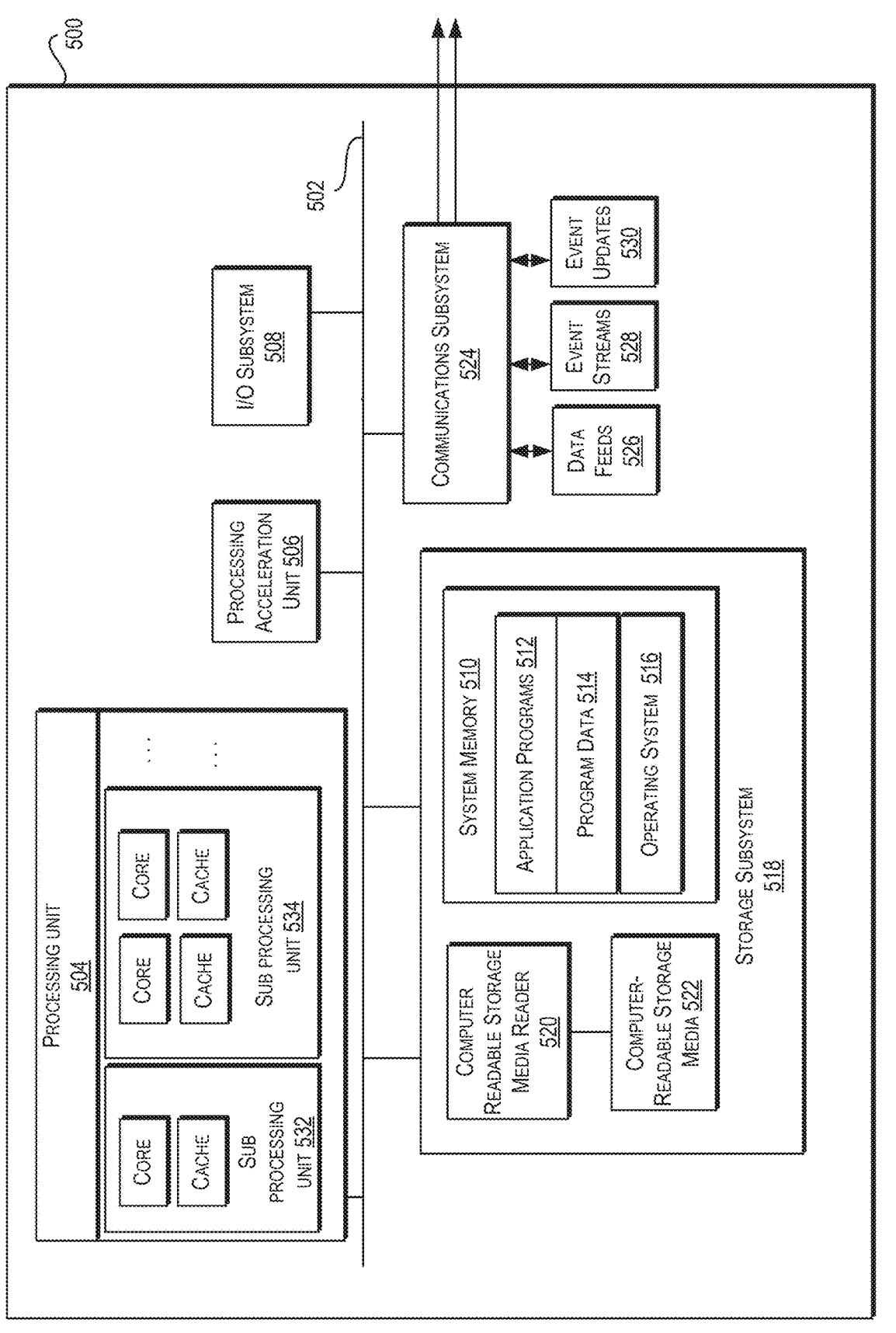
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), click-stream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Drift Detection System

Figure 6:
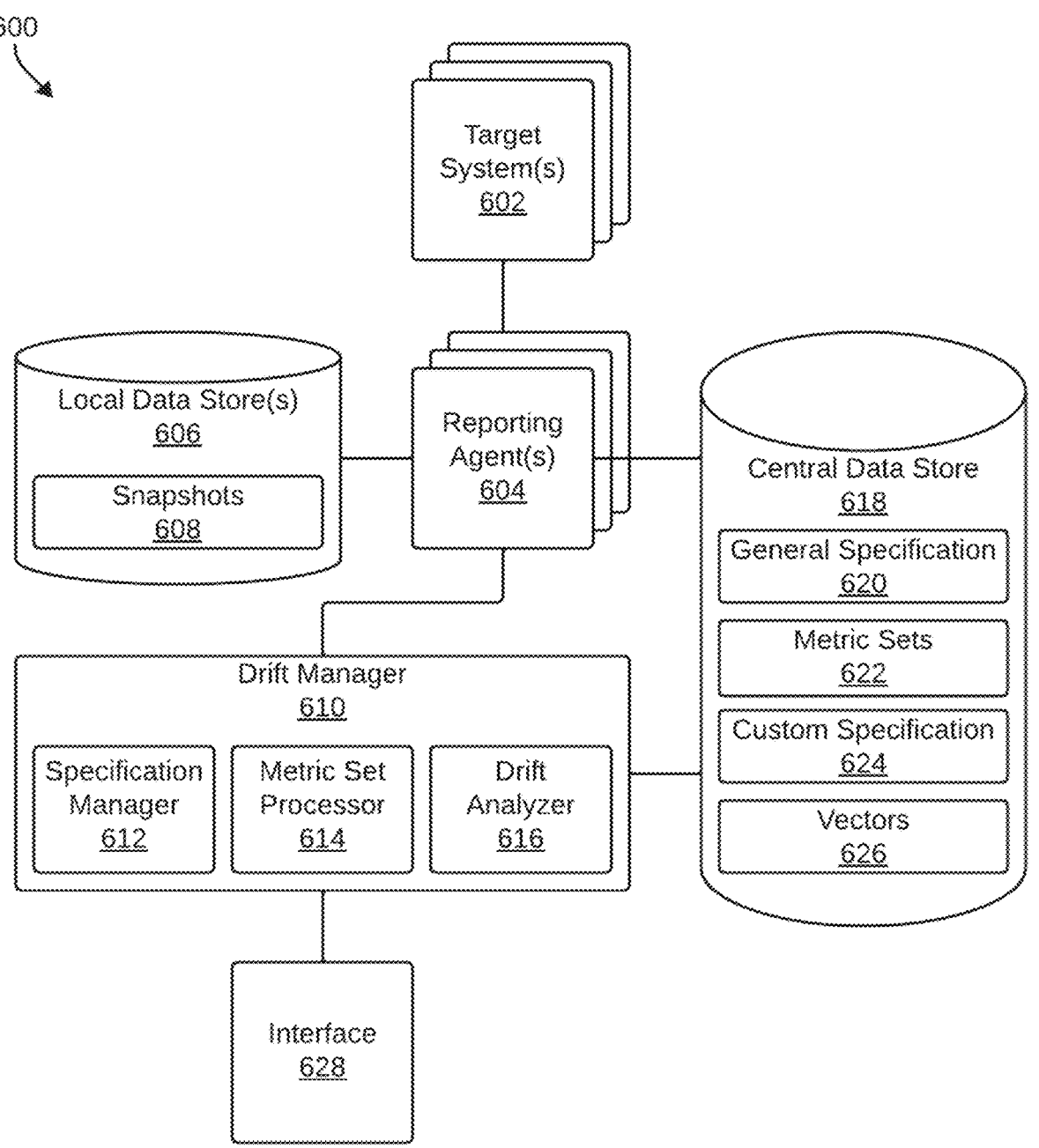
FIG. 6 illustrates a drift detection system in accordance with one or more embodiments.

FIG. 6 illustrates a system 600 in which techniques described herein may be practiced in accordance with one or more embodiments. As illustrated in FIG. 6, system 600 includes target system(s) 602, reporting agent(s) 604, local data store(s) 606, drift manager 610, central data store 618, and user interface 628. In one or more embodiments, the system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications, machines, and/or cloud environments. Multiple components may be combined into one application and/or machine. Operations described with respect to one component may instead be performed by another component.

In an embodiment, system 600 refers to software and/or hardware configured to detect drift. As used herein, the term "drift" refers to a misalignment between an observed state of a computing system and a target state of the computing system. An example target state is a state in which the computing system can generally be expected to function normally. It should be understood that use of the term "drift" with respect to a computing system does not imply any previous state of the computing system. For example, a computing system may be said to have "drifted" from a target state even if the computing system did not previously conform to the target state.

In an embodiment, target system(s) 602 refer to computing system(s) that are subjected to a drift detection process. Each target system 602 is a collection of one or more computing resources. A target system 602 may include software resource(s), hardware resource(s), and/or resource(s) that combine software and hardware. The structure of resources within a target system 602 may be hierarchical. For example, a target system 602 may include higher-level resource(s) (e.g., user data, database instances, application instances, virtual machine instances, virtual load balancer instances, etc.) and lower-level software and/or hardware resources that support the higher-level resource(s) (e.g., hypervisor, operating systems, database management systems, virtual hardware, CPU, volatile memory, persistent memory, networking interfaces, etc.). Resources of the same target system 602 may be local to or remote from one another. A target system 602 may share resources with another target system 602. For instance, lower-level resources (e.g., a host device) may be a component of multiple target systems 602.

In an embodiment, multiple target systems 602 are included in system 600. The multiple target systems 602 are subjected to the same drift detection process. The multiple target systems 602 are local to or remote from one another. The multiple target systems 602 are associated with a single entity, or the multiple target systems 602 are associated with multiple entities. In an example, each of the target systems 602 includes software resources that reside in a particular computing environment that is associated with a particular entity. In this example, it might be that each target system 602 includes a software resources belonging to a fleet of resources. In another example, software resources of multiple target systems 602 reside in isolated computing environments that are associated with separate entities.

In an embodiment, there are numerous target systems 602. For example, in some applications, there may be hundreds of target systems 602, thousands of target systems 602, tens of thousands of target systems 602, or more. Note that, in this example, any given target system 602 may contain numerous resources. For instance, a target system 602 may contain hundreds of resources, thousands of resources, tens of thousands of resources, or more.

In an embodiment, a target system 602 is cooperatively managed by multiple entities. As an example, assume that a target system 602 is a cloud computing system that is cooperatively managed by a cloud user and a cloud provider. The cloud user manages higher-level software resources of the target system 602. The cloud provider manages lower-level hardware resources of the target system 602, and/or the cloud provider manages lower-level software resources of the target system 602. Note that, in this example, both the cloud user and the cloud provider may have an interest in promptly detecting any drift experienced by the target system 602. The cloud user is interested in detecting drift due to the adverse impact the drift renders on the performance of the cloud user's software deployments, and the cloud provider is interested in detecting drift because a drift may compromise the cloud provider's ability to the meet the cloud provider's obligations to the cloud user. In this example, a drift detection process is initiated by the cloud user, by the cloud provider, by another party, and/or by the system 600 acting autonomously.

In an embodiment, reporting agent(s) 604 include logic for collecting state information. In particular, reporting agent(s) 604 are configured to collect state information of target system(s) 602. To this end, reporting agent(s) 604 can cause snapshot(s) 608 of target system(s) 602 to be generated. Based on the snapshot(s) 608, the reporting agent(s) 604 are further configured to generate metric set(s) 622 according to a general specification 620. Reporting agent(s) 604 can communicate the metric set(s) to drift manager 610, central data store 618, and/or other recipients.

In an embodiment, a reporting agent 604 collects state information of one target system 602, or the reporting agent 604 collects state information of multiple target systems

602. A reporting agent 604 that collects state information of a target system 602 is local to the target system 602, or the reporting agent 604 is remote from the target system 602. An example reporting agent 604 is a background process that runs on the same hardware platform as a target system 602 and/or a datastore 606.

In an embodiment, a reporting agent 604 employs one or more algorithms for generating a metric set 622. For example, reporting agent 604 may employ hashing algorithm(s) for generating a metric set 622. A hashing algorithm is a function that generates a hash value based on some input. A hash value may appear as a seemingly random sequence of information; however, the same input to a hashing algorithm will produce the same output. A hashing algorithm employed by reporting agent 604 may be a fuzzy hashing algorithm. Unlike other types of hashing algorithms, similar inputs to a fuzzy hashing algorithm will produce similar outputs. In contrast, some other types of hashing algorithm may produce significantly different outputs based on similar inputs. Examples of hashing algorithms that may be employed by a reporting agent 604 include FNV Hash, MurmurHash, MinHash, SimHash, CityHash, SHA-1, MD5 and others.

In an embodiment, a hashing algorithm employed by a reporting agent 604 is irreversible. An input to an irreversible algorithm cannot normally be determined based solely on the corresponding output to the irreversible algorithm. For example, if a hashing algorithm is irreversible, then an input to the hashing algorithm cannot be determined based solely on the corresponding output of the hashing algorithm. Using irreversible hashing algorithms may ensure that any sensitive information represented in a metric set 622 cannot be derived from the metric set 622. In this way, the system 600 may prevent unwanted sharing of sensitive information.

In an embodiment, a local data store 606 is any type of storage unit and/or device (e.g., a file system, database, collection of tables, or any other storage mechanism) for storing data. Further, a local data store 606 may include multiple different storage units and/or devices. The multiple different storage units and/or devices may or may not be of the same type or located at the same physical site. Further, a local data store 606 may be implemented or executed on the same computing system as other components of system 600. Additionally, or alternatively, a local data store 606 may be implemented or executed on a computing system separate from other components of system 600. The local data store 604 may be communicatively coupled to other components of system 600 via a direct connection or via a network.

In an embodiment, information describing snapshot(s) 608 may be implemented and stored across any of the components within the system 600. However, this information is illustrated in FIG. 6 within the data store(s) 606 for purposes of clarity and explanation.

In an embodiment, a snapshot 608 of a target system 602 captures state information of the target system 602 at a particular point in time. For instance, an example snapshot 608 of a target system 602 records the state of the target system 602 at the moment the snapshot 608 is created. Among other information, a snapshot 608 of a target system 602 may describe a hierarchy of resources within the target system 602. Note that the size and content of one snapshot 608 may greatly differ from the size and content of another snapshot 608. For instance, once target system 602 involved in a drift detection process may be much larger than another target system 602 involved in the same drift detection process even if the two target systems 602 serve identical, similar, or related functions. Thus, a snapshot 608 of the one target system 602 may contain much more information that another snapshot 608 corresponding to the other target system 602. An example snapshot 608 is generated in a sysDM format or another format.

In an embodiment, a snapshot 608 includes information that is relevant to a drift detection process, and the snapshot 608 includes information that is not relevant to a drift detection process. Note that the particular state information that is relevant to a drift detection process may vary depending on the application. It should also be noted that a snapshot 608 may contain sensitive information associated with a target system 602. Depending on the application, the system 600 may be prohibited from extracting sensitive information from a computing environment of a target system 602.

In an embodiment, drift manager 610 is software and/or hardware configured for managing drift in target system(s) 602. Drift manager 610 is implemented or executed on the same computing system as other components of system 600, and/or drift manager 610 is implemented or executed on a computing system separate from other components of system 600. In an example, drift manager 610 is implemented on a centralized data management platform. Drift manager 610 is communicatively coupled to other components of system 600 via direct connection(s) and/or network connection(s). As illustrated in FIG. 6, drift manager 610 may include specification manager 612, metric set processor 614, drift analyzer 616, and/or other components.

In an embodiment, specification manager 612 includes logic for administering specifications that can be utilized in a drift detection process. In general, the specifications administered by specification manager 612 include instructions for creating and/or modifying metric sets 622. Specification manager 612 can create a specification, modify a specification, store a specification, retrieve a specification, and/or otherwise manipulate a specification. Specification manager 612 can create or modify a specification autonomously, and/or specification manager 612 can create or modify a specification at the direction of a human user or device. Specification manager 612 can create a specification based on user input, characteristics of a user, characteristics of target system(s) 602, historical data, and/or other information. Specification manager 612 can obtain user input via user interface 628. Furthermore, specification manager 612 is configured to transmit communications to a user via user interface 628.

In an embodiment, specification manager 612 is configured to autonomously create and/or modify a specification. For example, specification manager 612 may autonomously create and/or modify general specification 620 or custom specification 624. Specification manager 612 is configured to autonomously generate a specification at regular intervals, and/or specification manager 612 is configured to autonomously generate a specification in response to condition(s), event(s), and/or other stimuli. In general, specification manager 612 autonomously creates and/or modifies a specification in response to detecting new or changed circumstances that are relevant to detecting drift. To this end, the specification manager 612 may be configured to query other components of system 600 for relevant information. Furthermore, specification manager 612 may instigate interactions with a user to obtain relevant information. For example, specification manager 612 may direct an unprompted query to a user that is designed to elicit information indicative of whether or not a new or updated specification is appropriate for drift detection.

In an embodiment, specification manager 612 is configured to apply natural language processing to user input.

Based on the natural language processing of user input and/or other information, specification manager 612 is further configured to generate a custom specification 624. Additionally, or alternatively, specification manager 612 employs a generative AI model (e.g., a large language model (LLM)) for formulating communications that can be directed to a user. For example, specification manager 612 may be configured to prompt an LLM to formulate a communication to a user that is designed to elicit additional information that can be used to generate a custom specification 624.

In an embodiment, specification manager 612 incorporates machine learning algorithm(s) and/or machine learning model(s). A machine learning algorithm is an algorithm that can be iterated to train a target model f that best maps a set of input variables to an output variable. For instance, specification manager 612 may apply a machine learning algorithm to train a machine learning model, and specification manager 612 may apply the machine learning model to generate a specification. In an example, specification manager 612 is configured to apply a machine learning model to a feature set to generate a custom specification 624. Furthermore, specification manager 612 is configured to update a machine learning model based on feedback received from a human user or device.

In an embodiment, a machine learning algorithm is an algorithm that can be iterated to train a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, that in turn updates the target model f.

In an embodiment, a machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data. Different target models can be generated based on different machine learning algorithms and/or different sets of training data.

In an embodiment, a machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, metric set processor 614 includes logic for processing metric sets 622. In particular, metric set processor 614 is configured to normalize metrics included in the metric set(s) 622, tailor the metrics of the metric set(s) 622 according to a custom specification 624, convert the metrics of the metric set(s) 622 into vector(s) 626, and/or perform other operations. Metric set processor 614 can obtain the metric set(s) 622 directly from reporting agent(s) 604, from central data store 618, and/or from other sources.

In an embodiment, drift analyzer 616 includes logic for performing a drift analysis on vectors 626. In particular, drift analyzer 616 is configured to apply one or more clustering algorithms to vectors 626, and drift analyzer 616 is further configured to evaluate the clusters of vectors for indications of drift in target systems 602. Drift analyzer 616 may incorporate various algorithms for clustering vectors 626. The clustering algorithm employed by drift analyzer 616 may vary depending on the application. Examples of clustering algorithms that may be employed by drift analyzer 616 include k-mode clustering algorithms, k-means clustering algorithms, density-based clustering algorithms, gaussian mixture model algorithms, balance iterative reducing and clustering using hierarchies (BIRCH) algorithms, affinity propagation clustering algorithms, and/or other algorithms.

In an embodiment, a central data store 618 is any type of storage unit and/or device (e.g., a file system, database, collection of tables, or any other storage mechanism) for storing data. Further, a central data store 618 may include multiple different storage units and/or devices. The multiple different storage units and/or devices may or may not be of the same type or located at the same physical site. Further, a central data store 618 may be implemented or executed on the same computing system as other components of system 600. Additionally, or alternatively, a central data store 618 may be implemented or executed on a computing system separate from other components of system 600. The central data store 618 may be communicatively coupled to other components of system 600 via a direct connection or via a network.

In an embodiment, information describing general specification 620, metric set(s) 622, custom specification 624, and vector(s) 626 may be implemented across any of the components within system 600. However, this information is illustrated in FIG. 6 within central data store 618 for purposes of clarity and explanation.

In an embodiment, general specification 620 defines metrics for representing the state of target system(s) 602. The metrics defined by the general specification 620 may vary depending on the application. The general specification 620 defines metric(s) for representing quantitative attribute(s) of a target system 602, and/or the general specification 620 defines metric(s) for representing qualitative attribute(s) of a target system 602. The general specification 620 defines a fixed set of metrics for each target system 602, or the general specification 620 defines different sets of metrics for different target systems 602. In an example, the metrics defined by the general specification 620 can be used to represent the state of a target system 602 in a manner that (a) excludes information that is irrelevant to a drift detection process and (b) does not reveal sensitive information found in a snapshot 608 of the target system 602.

In an embodiment, metric sets 622 represent the state of target system(s) 602. In particular, a metric set 622 representing a target system 602 describes resources within the target system 602. For instance, an example metric set 622 indicates how resources within a target system 602 are configured, how resources within the target system 602 are allocated (e.g., how lower-level resources are being allocated to higher-level resources), how resources within the target system 602 are being utilized, and/or other information. Each metric set 622 includes the same metrics, or different metric sets 622 contain different metrics. The metrics included in the metric sets 622 may vary depending on the application. In general, the metrics included in the metric set 622 depends on a general specification 620 and/or a custom specification 624 of a given application.

In an embodiment, a metric set 622 includes metrics for representing quantitative attributes of a target system 602, and/or the metric set 622 includes metrics for representing qualitative attributes of the target system 602. An example metric set 622 represents both quantitative and qualitative attributes of a target system 602. The example metric set 622 represents the quantitative attributes of the target system using statistics such as counts, minimums, maximums, means, deviations, aggregations, and so. Qualitative attributes of the target system 602 are represented in the example metric set 622 by digital signatures or similar data structures. In an example, digital signatures are expressed in a metric set 622 as numerical values. For instance, the system 600 may employ a hashing algorithm that outputs numerical hashes, or the system 600 may convert a hash value to one or more numerical values.

In an embodiment, a metric set 622 representing a target system 602 includes categories of different metrics. The categories of the metric set 622 correspond to different types of resources in the target system 602 and/or different types of heuristics for measuring the state of the target system 602. An example metric set 622 includes a CPU category, a memory category, a database category, an applications category, a processes category, a non-uniform memory access category, an input output category, a custom category and/or other categories. In this example, each category may include multiple metrics.

In an embodiment, custom specification 624 defines modifications to metric sets 622. In general, the modifications set forth by custom specification 624 are designed to make metric sets 622 more suitable for a particular profile. As used herein, the term "profile" refers to the circumstances of a particular drift detection process. Custom specification 624 may dictate that metric(s) in the metric set(s) 622 are altered, that metrics in the metric set(s) 622 are removed, that additional metric(s) not defined by general specification 620 are added to the metric set(s) 622, and/or other modifications to the metric set(s) 622. In an example, the custom specification 624 dictates that scaling be applied to a subset of metrics in a metric set 622. In this example, scaling is applied to a single metric in the metric set 622, or scaling is applied to multiple metrics in the metric set 622. If, in this example, scaling is applied to multiple metrics in the metric set 622, uniform scaling is applied to the multiple metrics, or nonuniform scaling is applied to the multiple metrics. In the latter scenario, the multiple metrics are scaled by differing amounts in this example, and/or the multiple metrics are scaled in differing directions in this example. Scaling a metric may be accomplished by adding weight to one metric, and/or scaling the metric may be accomplished by removing weight from another metric. As used herein, "adding weight" to a metric generally refers to an operation that increases the metric's significance in a drift detection process, and "removing weight" from a metric generally refers to an operation that reduces the metric's significance in a drift detection process. Note that, in some applications, a reduction in value to a numerical metric may correspond to an increase in the metric's significance to a drift detection process. Furthermore, a metric's significance in a drift detection process may be elevated or diminished without actually altering the metric. Accordingly, it should also be noted that "adding weight to a metric" does not necessarily imply an increase or even a change to the metric.

In an embodiment, vector(s) 626 represent attributes of target system(s) 602. In particular, vector(s) 626 may represent information included in metric set(s) 622, information determined based on metric set(s) 622, and/or other information. The specific attributes represented by vector(s) 626 may vary depending on the circumstances of a drift detection process. In an example, vectors 626 are fixed-length vectors, and each target system 602 is represented by the same number and type of vectors 626. However, in another example, vectors 626 may be of variable lengths, and different target systems 602 may be represented by a different number and/or different types of vectors 626.

In an embodiment, a single vector 626 represents a target system 602, or multiple vectors 626 represent the target system 602. Additionally, or alternatively, a single vector 626 may represent multiple target systems 602. For instance, the system may generate a vector 626 to represent a group of related target systems 602.

In an embodiment, a vector 626 is defined by a single dimension, or the vector 626 is defined by multiple dimensions. In general, a vector's 626 number of dimensions may vary depending on the circumstances of a drift detection process. A dimension of a vector 626 may directly correspond to a metric of a metric set 626. For example, if a metric set 622 includes a metric that represents a number of CPUs possessed by a target system 602, a corresponding dimension of a vector 626 may also represent the number of CPUs possessed by the target system 602. In another example, a vector 626 includes dimensions corresponding to a subset of the metrics in a metric set 622. For instance, the vector 626 might include a dimension for each metric in a category of metrics within the metric set 622. In yet another example, a vector 626 includes a corresponding dimension for each metric in a metric set 622.

In an embodiment, a metric in a metric set 622 may be represented by multiple dimensions of a vector 622. In an example, the single metric in the metric set 622 is a complex digital signature that cannot be adequately represented by a single dimension. Additionally, or alternatively, a metric in a metric set 622 may be represented by multiple vectors 626.

In an embodiment, interface 628 refers to hardware and/or software configured to facilitate communications between a user and system 600. Interface 628 renders user interface elements and receives input via user interface elements. Examples of interfaces include but are not limited to a graphical user interface (GUI), a command line interface (CLI), a haptic interface, a voice command interface, an API, and others. Examples of user interface elements include checkboxes, radio buttons, dropdown lists, list boxes, buttons, toggles, text fields, date and time selectors, command lines, sliders, pages, forms, and others.

In an embodiment, different components of interface 628 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 628 is specified in one or more other languages, such as Java, C, or C++.

In an embodiment, interface 628 is implemented, at least in part, using a CLI. Components of the CLI may be specified using various languages and frameworks suitable for handling command-line inputs and outputs. For instance, the behavior of CLI commands may be implemented in a dynamic programming language such as JavaScript (Node.js), Ruby, Python, etc. The content and structure of the CLI may be specified using custom libraries or standard libraries (e.g., commander, thor, argparse, etc.) configured for parsing commands, subcommands, arguments, options, and so on. The formatting of command outputs is handled using text formatting libraries (e.g., chalk, rainbow, colorama, etc.). Further, the CLI may be configured to accept scripts or shell commands that can be utilized to execute system-level instructions directly. Additionally, or alternatively, the CLI can be implemented in other languages such as (e.g., Go, Rust, Java, etc.) using their respective libraries and tools to handle command parsing and execution.

In an embodiment, interface 628 is implemented, at least in part, using an API. Components of the API may be specified using various languages and frameworks suitable for administering API endpoints. For instance, the behavior of API endpoints may be implemented in a server-side programming language such as JavaScript (Node.js), Ruby, Python, etc. The structure and content of the API, including endpoints, request methods, and response formats, are specified using frameworks such as Express for Node.js, Rails for Ruby, or Flask for Python. The serialization and deserialization of data are handled using libraries like JSON and XML parsers. Additionally, the API may be configured to support authentication and authorization mechanisms (e.g., OAuth, JWT (JSON Web Tokens), API keys, etc.) to secure the endpoints. Alternatively, or additionally, the API can be implemented in other languages (e.g., Go, Rust, Java, etc.) using their respective frameworks and libraries to handle request routing, data processing, and security.

In an embodiment, system 600 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

5. Performing a Drift Detection Process

Figure 7:
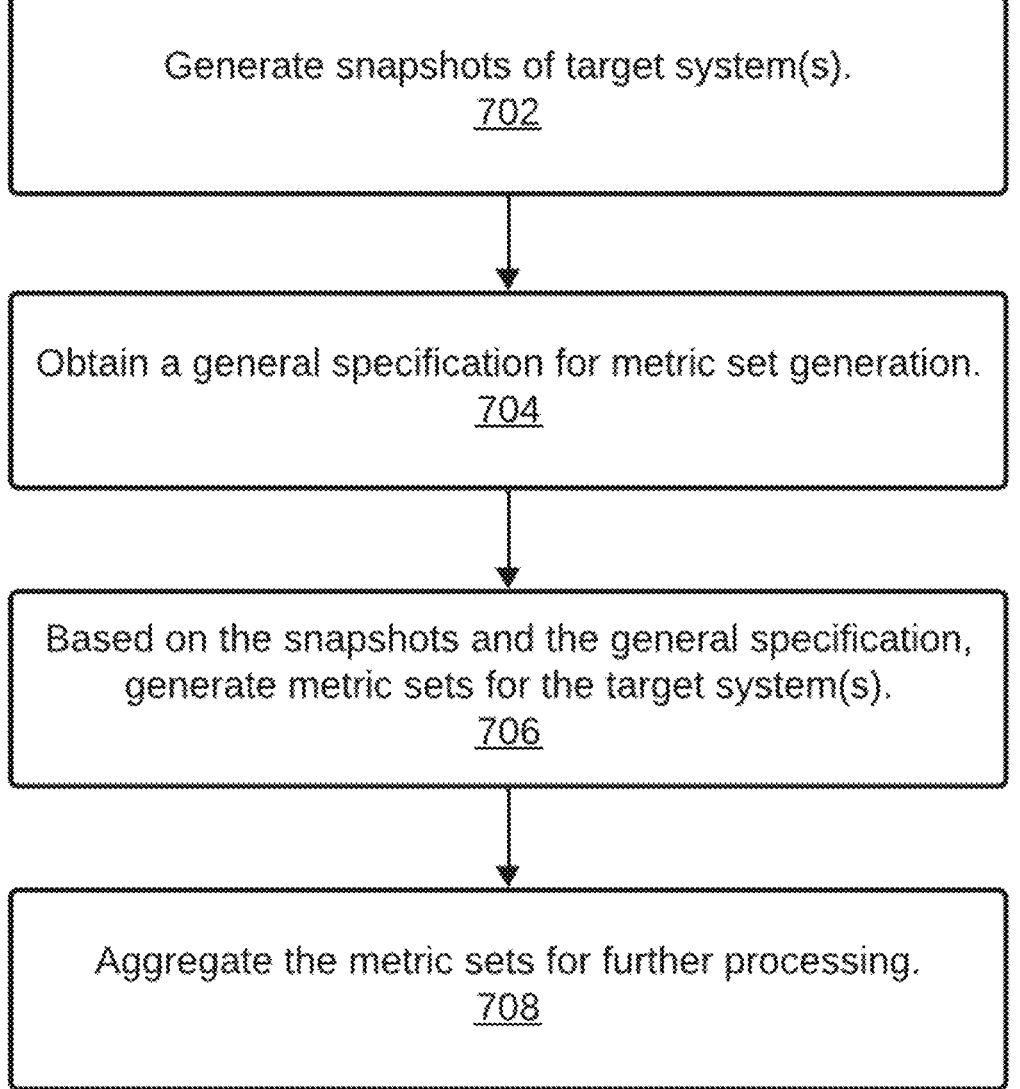
FIG. 7 illustrates an example set of operations for collecting state information in accordance with one or more embodiments.
Figure 8:
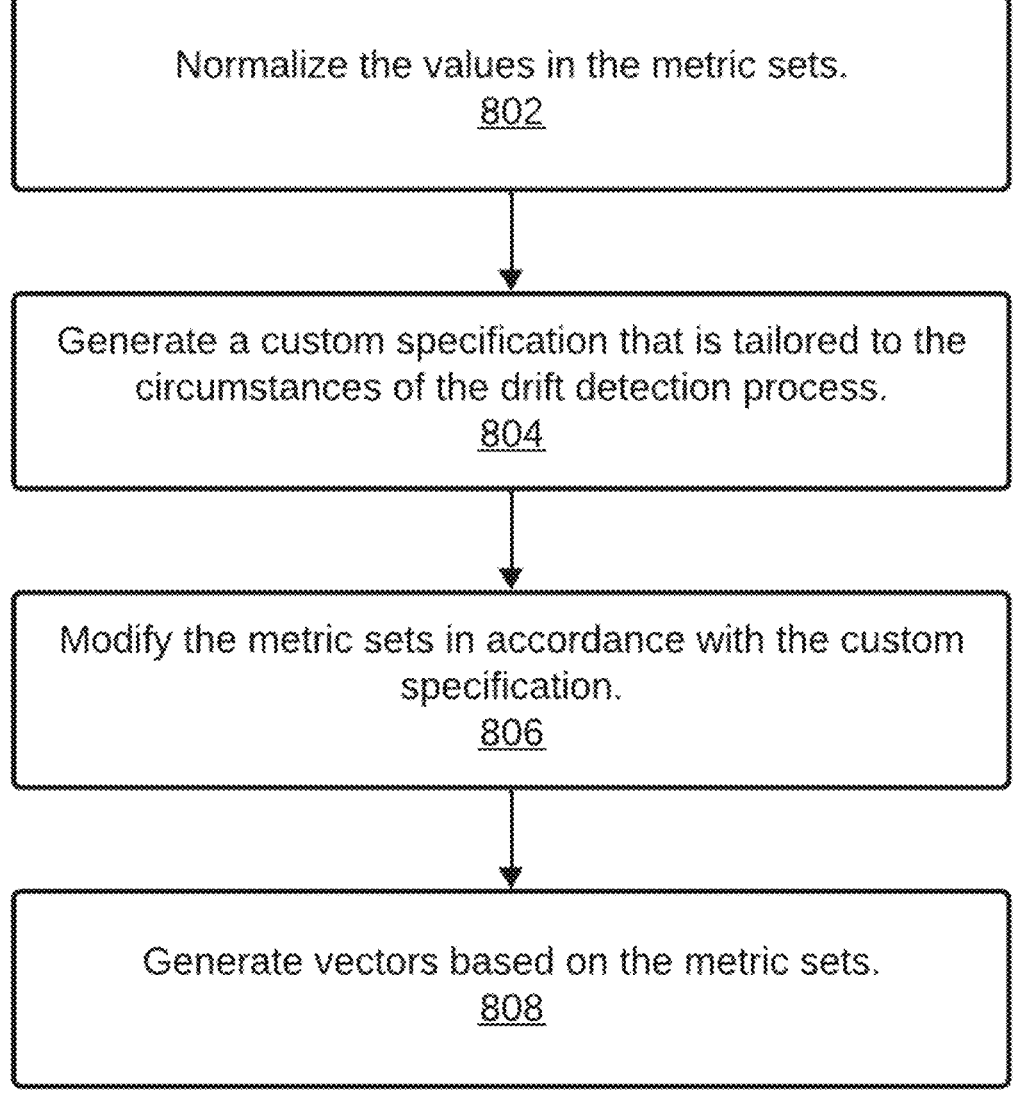
FIG. 8 illustrates an example set of operations for processing metric sets in accordance with one or more embodiments.
Figure 9:
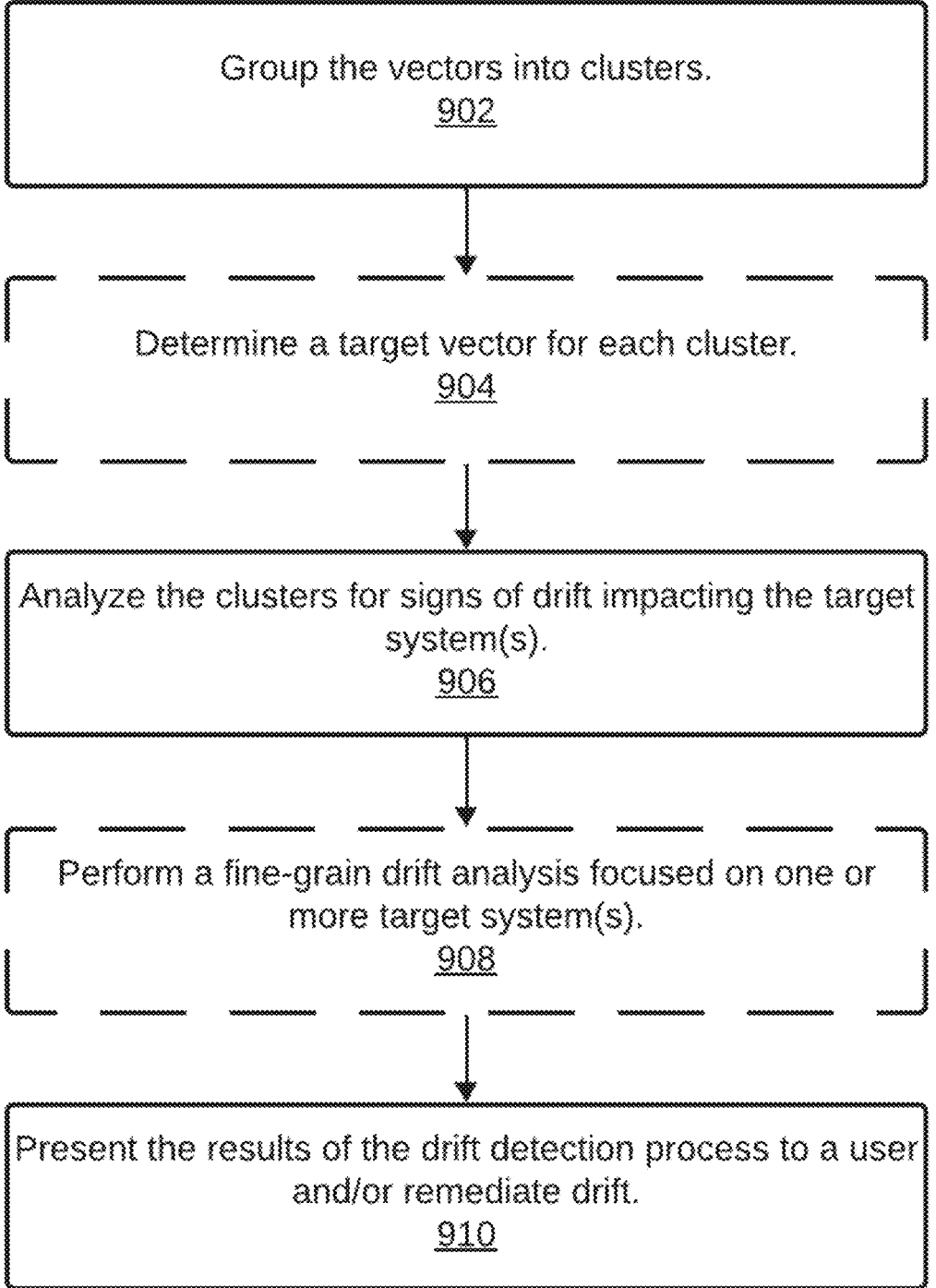
FIG. 9 illustrates an example set of operations for performing a drift analysis in accordance with one or more embodiments.

FIGS. 7, 8, and 9 illustrate example sets of operations for a drift detection process in accordance with one or more embodiments. One or more operations illustrated in FIGS. 7, 8, and/or 9 may be modified, rearranged, or omitted all together. Accordingly, the particular sequence of operations should not be construed as limiting the scope of one or more embodiments.

In an embodiment, a drift detection process is initiated autonomously by the system, or the drift detection process is initiated by a human user. The drift detection process is initiated in response to some indication that a drift associated with the virtual machine fleet 1104 has occurred, and/or the drift detection process is initiated in accordance with routine monitoring procedures.

5.1 Collecting State Information

FIG. 7 illustrates an example set of operations for collecting state information of target systems in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In an embodiment, the system generates multiple snapshots (Operation 702). Each snapshot records state information of a target system at a particular point in time (e.g., the moment the snapshot is generated). The system generates snapshot of multiple target systems. For instance, the system may generate a snapshot of each target system in a group of related target systems (e.g., a fleet of virtual machines, databases, applications, etc.). Additionally, or alternatively, the system generates multiple snapshots of a single target system. For instance, the system may generate multiple snapshots of a single target system to reflect the target system's state at different points in time. In an example, the system generates each snapshot of a target system in a sysDM format.

Note that a snapshot of a target system may contain a large amount of information, and only a portion of the information contained in the snapshot may be relevant to a drift detection process. Furthermore, the system may generate a large number of snapshots in a single application. For example, in some applications, the number of snapshots generated by the system may extend into the hundreds, thousands, or even more. As a consequence of the foregoing, considering the totality of the information included in the snapshots may be impractical for some drift detection processes.

It should also be noted that a snapshot of a target system may contain sensitive information. For instance, a snapshot of a target system may contain sensitive user data associated with the target system. The system may be prohibited from harvesting sensitive information in some applications. Thus, if a snapshot of a target system contains sensitive information, the system may be prohibited from extracting the snapshot from the target system's computing environment.

In some applications, a snapshot of target system is created by a reporting agent that is running as a background process in the same computing environment as the target system. Once a snapshot is generated, the reporting agent may initiate further processing of the snapshot, or the reporting agent may store the snapshot locally to await further processing.

In an embodiment, the system obtains a general specification for generating metric sets (Operation 704). In particular, the system accesses a pre-defined general specification, or the system formulates a new general specification. The system may maintain different general specifications for different scenarios, or the system may maintain a single general specification that is applicable to any given scenario. If the system maintains multiple general specifications, the system may select a general specification for an application based on the characteristics of target systems, user characteristics, user input, and/or other information. As an example, assume that a drift detection process is directed to detecting drifts associated with a fleet of virtual machines. In this example, the system might select a general specification that is generally suitable for detecting drift in target systems that contain virtual machines.

In an embodiment, the system generates metric sets to represent the target systems (Operation 704). At least one metric set is generated for each target system. The system generates a metric set for a target system based on the general specification, one or more snapshots of the target system, and/or other information. Generating a metric set based on a snapshot may entail retrieving values from the snapshot, determining values based on the snapshot (e.g., calculating a new value based on values retrieved from the snapshot), and/or other operations. The system determines the same metrics for each target system, or the system determines different metrics for different target systems. The metric sets indicate how resources are configured within the target systems, how resources are allocated within the target systems, Pa 44 how resources are utilized within the target systems, and/or other information. A metric set that represents a target system describes quantitative attribute(s) of the target system, and/or the metric set describes qualitative attribute(s) of the target system. In an example, the system generates various statistics to represent quantitative attributes of a target system (e.g., counts, minimums, maximums, means, deviations, etc.), and the system generates digital signatures to represent qualitative attributes of the target system.

Note that a metric set is generally smaller in size than a snapshot that is a basis for determining the metric set. Depending on the application, performing a drift analysis based on the metric sets rather than the snapshots may reduce the amount of information that the system needs to process during the drift analysis. In some cases, this reduction in size may significantly reduce the cost and complexity of performing the drift analysis.

In some applications, the systems generates the metrics sets such that the metric sets do not reveal any sensitive information that might be found in the snapshots. However, note that it may be undesirable to entirely discount sensitive information from a drift analysis. For instance, a dataset in a snapshot may simultaneously be (a) relevant to detecting drift and (b) sensitive information. Rather than entirely discounting sensitive information from a drift analysis, the system may employ various techniques for representing sensitive information in a metric set without revealing the sensitive information in the metric set.

In some applications, the system generates the metric sets using a hashing algorithm, or the system generates the metric sets using multiple hashing algorithms. In an example, the system obtains a dataset from a snapshot of a target system, the system inputs the dataset to a hashing algorithm, the hashing algorithm outputs a hash value, and the system includes the hash value in a metric set that represents the target system. A hash value included in a metric set is the product of a single hashing algorithm, or the hash value is the product of a series of hashing algorithms. The system uses hash values to represent qualitative attributes of the target systems, and/or the system uses hash values to represent quantitative attributes of target systems.

Note that using hash values to represent qualitative and/or quantitative attributes of target systems enables the system to represent sensitive information in a metric set without revealing the sensitive information in the metric set. As an example, assume that a snapshot of a target system describes a particular attribute of the target system, and further assume that the particular attribute is sensitive information. In this example, the system inputs the particular attribute to a hashing algorithm, the hashing algorithm generates a hash value based on the particular attribute, and the system includes the hash value in a metric set representing the target system. The hash value may appear as a seemingly random string; however, the same input to the hashing algorithm will always produce the same hash value. Therefore, the system can use the hash value to identify other target systems that also possess the particular attribute. At the same time, the metric set does not literally describe the particular attribute.

In some applications, the system generates the metric sets using a fuzzy hashing algorithm, or the system generates the metric sets using multiple fuzzy hashing algorithms. Recall that a fuzzy hashing algorithm will produce similar hash values based on similar inputs. Accordingly, using fuzzy hashing algorithms may enable the system to identify target systems having similar attributes. As an example, assume that a snapshot of a target system describes a particular attribute of the target system, and further assume that the particular attribute is input to a fuzzy hashing algorithm. Based on the particular attribute, the fuzzy hashing algorithm generates a particular hash value. In this example, the system can identify other target systems having an attribute that is similar to the particular attribute by identifying other metric sets that have a hash value that is similar to the particular hash value.

In some applications, a metric set representing a target system is created by a reporting agent that is running as a background process in the same computing environment as the target system. By generating the metric set in the same computing environment as the target system, the system avoids having to transport irrelevant information included in the snapshot to a different computing environment. Furthermore, generating the metric set in the same computing environment as the target system may enable the system to manipulate sensitive information that the system would otherwise be prohibited from accessing.

In an embodiment, the system aggregates the metric sets for further processing (Operation 706). The location where the metric sets are aggregated by the system may vary depending on the application. An aggregation point for a metric set that represents a target system may be within the target system's computing environment, or the aggregation point for the metric set may be external to the target system's computing environment. In an example, a metric set representing a target system is generated in a tenancy associated with the target system, and the system extracts the metric set to a separate tenancy.

Note that sanitizing a metric set of sensitive information may enable the system to remove the metric set from the computing environment of a target system without fear of violating any restriction on the harvesting and/or sharing of sensitive information. As an example, consider a particular attribute of a target system that is (a) relevant to a drift detection process and (b) sensitive information. For the purpose of this example, assume that a prohibition exists on extracting sensitive information from the computing environment of the target system, and further assume that the metric sets are being collected in a computing environment that is apart from the computing environment of the target system. Thus, in this example, the system is prevented from including the particular attribute in a metric set that represents the target system. However, if the particular attribute is represented in the metric set using a hash value, the prohibition does not prevent the system from extracting the metric set from the target system's computing environment.

Further note that the ability to collect metric sets in a computing environment that is separate from the computing environment of a target system may be desirable in some applications. Example applications in which it might be desirable to collect metric sets in a computing environment separate from the computing environment of a target system include a drift detection process that involves co-managed target systems, a drift detection process that involves two or more target systems that reside in separate computing environments, and/or various other drift detection processes.

5.2 Processing Metric Sets

FIG. 8 illustrates an example set of operations for processing metric sets as part of a drift detection process in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments.

In an embodiment, the system normalizes values included within metric sets (Operation 802). If each value in a metric set is expressed is a numerical value, the system may normalize each value in the metric set within a defined range. In an example, each value in a metric set is normalized to an absolute value that is equal to or less than one. Normalizing the values in a metric set ensures that larger values in the metric set do not overshadow smaller values in the metric set during a drift detection process. As an example, assume that a metric set includes (a) a CPU count metric that measures a target system's number of CPUs and (b) a memory total metric that measures the target system's total persistent memory in gigabytes (i.e., $10^9$ bytes). For the purposes of this example, consider a target system that has 10 CPUs and 1 terabyte (i.e., $10^{12}$ bytes) of persistent memory. In this example, prior to normalization, the target system's CPU count metric holds the value 10 and the target system's memory total metric holds the value 1000. If these two metrics are not normalized, and if these two metrics are used as separate dimensions of the same vector, the influence of the memory total metric on the vector will greatly outweigh the influence of the CPU count metric on the vector in this example. However, at the same time, it might be that the CPU count metric is actually more significant to a drift detection process than the memory total metric.

In an embodiment, the system generates a custom specification for a drift detection process based on a feature set (Operation 804). The system generates the custom specification autonomously, or the system generates the custom specification at the direction of a user. In general, the feature set includes information that is potentially relevant to tailoring the metric sets to the circumstances of a particular drift detection process. The feature set may include information that is determined by the system, information that is obtained from a user, information that is obtained from another device, and/or information that is obtained through other means. Any circumstance of a drift detection process may be described by the feature set. For instance, a feature set may include attributes of target systems, characteristics of relevant users, historical data, user input, and/or other information.

In some applications, a feature set includes attributes of target systems. In an example, the system generates the custom specification based, at least in part, on information that has been included in the metric sets. For instance, the system may inspect the metric sets to see if the metric sets contain any metrics that can be removed as a result of those metrics holding no value and/or as a result of those metrics holding the same value in every metric set.

In some applications, the feature set includes characteristics of relevant users. A relevant user may be any entity that is associated with a target system and/or any user that is associated with a drift detection process. Note that the identity of the user that initiates a drift detection process may in itself be an important consideration for generating a custom specification. As an example, consider a target system that is cooperatively managed by a cloud user and a cloud provider. In this example, both entities may be interested in detecting drift; however, the cloud user may be interested in detecting different types of drift than the cloud provider. Some applications may involve multiple relevant users. For instance, different target systems may be operated by different entities, and any given target system may be cooperatively managed or used by multiple entities.

In some applications, the feature set includes historical data. Example historical data that may be a basis for generating a custom specification includes recent changes to the settings of target systems, issues experienced by the target systems, past operating conditions of target systems, recent activity of relevant users, data collected from previous drift analyses, and/or other information.

In some applications, the feature set may describe a current status of target system(s) relative to another state of the target system(s). For instance, a feature set may indicate if the target system(s) are currently within a maintenance window for those target system(s). In this example, a resulting custom specification may dictate the inclusion or emphasis of metric(s) that would be of lesser or no relevance to another drift analysis that occurs outside of the maintenance window. Further, the resulting custom specification in this example might call for the exclusion of other metrics that would be of greater importance to the other drift analysis that occurs outside of the maintenance window.

In some applications, the feature set includes user input or information determined based on user input. User input is received via a user interface or other means. The system actively collects user input (e.g., by requesting input from a user), and/or the system passively collects user input. To solicit user input, the system may direct queries to the user via a user interface. In an example, the systems receive user input indicating an issue experienced by a user, a drift suspected by the user, recent changes made by the user, specific criteria to be considered in a drift detection process, a type of drift analysis that is to be performed, custom metrics and/or custom metric categories to be included in the metric set, and/or various other information.

In some applications, the system employs natural language processing to obtain information that can be used as a basis for generating a custom specification. For example, while interacting with a user, the system may receive natural language input that describes an issue that the user is experiencing. Upon receiving the natural language input, the system applies natural language processing to the user input to generate a feature set that can be used as a basis for generating the custom specification.

In some applications, the system employs generative AI to obtain information that can be used as a basis for generating a custom specification. For example, the system may utilize an LLM to formulate a communication that is designed to elicit information that is relevant to generating a custom specification.

In some applications, the system applies a machine learning model to generate the custom specification. The system may employ a single machine learning model, or the system may employ multiple machine learning models. Additional embodiments and/or examples relating machine learning techniques for generating a custom specification are described below in Section 8, titled "Machine Learning for Drift Detection."

In an embodiment, the system modifies the metric sets in accordance with the custom specification (Operation 806). In general, the custom specification proscribes changes to the metric sets that are intended to make the metric sets more suitable for the circumstances of a particular drift detection process. Bringing a metric set into compliance with the custom specification may entail altering metric(s) in the metric set, adding metric(s) to the metric set, removing metric(s) from the metric set, and/or other modifications. The custom specification defines changes that are equally applicable to all metric sets. As an example, assume that an instance of a particular metric exists in each metric set. In this example, the general specification may require that each instance of the particular metric be altered in the same way. Additionally, or alternatively, the custom specification defines changes that are conditional and/or are directed to particular metric sets. For example, the custom specification may require a specific change be made to only some of the metric sets.

In some applications, scaling is added to a subset of metric(s) in a metric set. For example, weight may be added to a subset of metric(s) in a metric set, and/or weight may be removed from a subset of metric(s) in a metric set. The manner that scaling is applied a metric may depend on the type of metric (e.g., numerical or otherwise), the nature of a forthcoming drift analysis, and other implementation details. The system may apply scaling to a metric for various reasons. In an example, the custom specification dictates that weight be added to a particular metric because the particular metric is deemed to be especially important for the present application. For instance, it may be that the particular metric corresponds to a setting of a target system that is deemed to be especially likely to cause a drift in the target system if the setting is misconfigured. In another example, the system removes weight from a particular metric because the particular metric does not tend to be associated with drift in the target systems of the present application. In yet another example, the system removes weight from a particular metric because each instance of the particular metric is the same. For instance, it may be that the particular metric is a version hash, and each target system is of the same version. Thus, the significance of the particular metric can be discounted. In yet another example, the system applies scaling to a particular metric pursuant to the instructions of a user.

In some applications, the system removes a subset of metric(s) from a metric set. The custom specification may provide for the removal of a metric from a metric set for a variety of reasons. In an example, the custom specification provides for the removal of a metric because the metric is irrelevant to the present application. In another example, the custom specification dictates that a metric be removed because it has been determined that the metric may have an adverse impact on a forthcoming drift analysis. In yet another example, the system removes a metric from a metric set at the direction of a user.

In some applications, the system includes additional metric(s) in a metric set. An additional metric that is added to a metric set is a predefined metric that the system draws from a pool of predefined metric, or the additional metric is a custom metric that is formulated for a given application. A variety of rationales may lead to a metric set being supplemented with additional metric(s). For example, it may be that, while an additional metric is not generally applicable to detecting drift, the particular metric is relevant to detecting drift in a specific type of target system. In another example, an additional metric added to a metric set is a custom metric that has been defined by a user. In yet another example, an additional category of metrics is added to a metric set. The additional category of metrics contains additional predefined metrics and/or additional custom metrics.

In an embodiment, the system generates vectors to represent attributes of target systems (Operation 808). The system generates a single vector to represent a target system, or the system generates multiple vectors to represent a target system. The system generates fixed-length vectors, and/or the system generates variable length vectors. The vectors are generated based, at least in part, on the metric sets. In an example, the system generates a single vector based on the metrics of a metric set. In another example, the system generates multiple vectors based on the metrics of a metric set. In this example, the dimensions of each vector may correspond to a subset of metrics in the metric set. For instance, the system may generate one vector based on one category of metrics in the metric set, and the system may generate another vector based on another category of metrics in the metric set.

Note that, depending on the manner that the system applies scaling to metric(s), a dimension corresponding to a scaled metric may exert more influence on a vector than a dimension corresponding to an unscaled metric. As an example, consider a vector that is defined by two dimensions that respectively correspond to two metrics of a metric set. For the purpose of this example, assume that the two metrics correspond to two quantitative attributes of a computing resource, and further assume that a custom specification dictates that weight be added to one of the two metrics (e.g., by multiplying the metric by a value greater than one, by adding a positive value to the metric, etc.). In this example, if the two metrics were equal prior to the custom specification being applied, it can be expected that the weighted metric will have a larger influence on the vector than the unweighted metric.

5.3 Performing a Drift Analysis

FIG. 9 illustrates an example set of operations for performing a drift analysis as part of a drift detection process in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments.

In an embodiment, the system groups vectors into clusters (Operation 902). In general, the number of clusters that the system chooses to generate may depend on attributes of the target systems, a type of drift that is suspected, an issue that is occurring, and/or various other factors. The system may select a number of clusters to generate based on an elbow method, a silhouette analysis, a gap statistic, an Akaike information criterion, a Bayesian information criterion, and/or other analyses. To group vectors into clusters, the system applies a single clustering algorithm, or the system applies multiple clustering algorithms. A variety of clustering algorithms may be employed for this purpose. Examples of clustering algorithms include k-mode clustering algorithms, k-means clustering algorithms, density-based clustering algorithms, gaussian mixture model algorithms, BIRCH algorithms, affinity propagation clustering algorithms, and/or other algorithms.

In some applications, the system generates a similarity matrix that can be used by a clustering algorithm to group vectors. The similarity matrix is a matrix of scores that represent similarity between vectors. For example, an element in the matrix may indicate how similar or dissimilar two vectors are. Note that some algorithms may require a similarity matrix to effectively cluster the vectors. Thus, whether or not the system generates a similarity matrix may depend on the clustering algorithm(s) employed by the system in a given application.

In some applications, the system applies different clustering algorithms to different vectors. For example, if the system generates two vectors to represent a single target system, the system may apply one type of clustering algorithm to one of the vectors, and the system may apply another type of clustering algorithm to the other vector.

In an embodiment, the system may determine a target vector for each cluster of vectors (Operation 904). A target vector for a cluster corresponds, at least partially, to a target state for the target systems that are represented by vectors in the cluster. An example target vector of a cluster includes the same type and number of dimensions as the vectors in the cluster. The manner that the system determines a target vector may vary between drift collection processes. Information that may influence the determination of a target vector includes characteristics of a cluster, dimensions of the vectors in the cluster, user input, attributes of target systems, and/or other information.

In some applications, the system selects a vector in cluster to serve as the target vector for the cluster. In an example, the system selects a vector in a cluster to serve as a target vector based on the vector's position relative to the cluster's medoid, centroid, mode, furthest sampling point, and/or other characteristics. In another example, the system selects a vector in a cluster to serve as a target vector based on receiving user input indicating a target system corresponding to that vector has a target state.

In some applications, the system generates a target vector. Generating the target vector may entail individual determining each dimension of the target vector. In an example, the system determines a dimension of a target vector based on the mean of that dimension in a cluster. In another example, the system determines a dimension of a target vector based on the median of that dimension in a cluster. The manner that the system determines one dimension of a target vector may differ from the manner that the system determines another dimension of a target vector. As an example, consider a cluster that is made up of vectors having two dimensions. In this example, the system determines one dimension of a target vector based on the mode of that dimension within the cluster, and the system determines the other dimension of the target vector based on the median of that dimension within the cluster.

In an embodiment, the system analyzes the clusters for indications of drift in target systems (Operation 906). How the system evaluates the cluster for indications of a drift may vary between drift detection processes. In an example, the system detects a drift based on a significant number of vectors falling into a cluster that represents a suboptimal state. In another example, the system detects a drift based on a significant number of clusters not fitting well into any existing cluster. Evaluating a cluster for signs of drift may be non-trivial in some cases. For instance, a slight misalignment in a cluster might be the only manifestation of a severe drift in a target system. How prominently a drift manifests itself in a cluster may depend on the dimensions that define the vectors in the cluster, the size of the cluster, the density of the cluster, the type of the cluster, the shape of the cluster, and/or various other factors. Note that changes to the metric sets may influence these factors. Further note that, as a result of modifying the metric sets according to a custom specification, the content and configuration of a cluster may be better suited for detecting drift in the circumstances of any given drift detection process.

In some applications, the system is configured to analyze the clusters for indications of drifts that impact multiple target systems. For instance, the system may prioritize canvasing a cluster for vectors that possess identical, similar, and/or related deviations. Note that prioritizing the detection of group-level drifts may be more suitable for some detection processes than others. As an example, assume that the target systems include a fleet of resources that are managed as a unit, and further assume that a cloud user misconfigures a single setting of the fleet. In this example, the misconfiguration of the single setting causes the same drift to occur in multiple resources within the fleet. As another example, consider a group of target systems that share a common lower-level hardware resource. In this example, a malfunction of the lower-level hardware resource causes a similar drift to occur in the group of target systems. As yet another example, assume that a large number of target systems are included in a drift detection process. In this example, a drift corresponding to a slight misalignment of a vector might be difficult to perceive due to the inherent noise and variability that results from the inclusion of a large number of vectors within a cluster. However, a misalignment of multiple vectors in an identical, similar, and/or related way may be a more reliable indication of drift within target systems.

In some applications, the system evaluates a cluster for indications of drift based on a target vector for the cluster. For instance, the system may gauge the likelihood and/or potential severity of a drift based on a vector's proximity to a target vector.

In some applications, the system maps vectors in a cluster to the corresponding target systems, and/or the system maps dimensions of vectors to resources within a target system. The mappings may enable the system to specifically identify target systems experiencing drift, symptoms of drifts, causes of drifts, and/or other aspects of drifts. For example, the system may map an irregular dimension of a vector to abnormal resource configuration within a target system, abnormal resource allocation within a target system, abnormal resource utilization within a target system, and/or other characteristics of a drift. Note that, as a result of representing potentially sensitive information with digital signatures such as hashes, the system may pinpoint a resource associated with a drift even if that resource corresponds to sensitive information. For example, the system may identify a misconfiguration of a resource as a cause of a drifting target system even if the resource's settings are sensitive information that cannot be extracted from the target system.

In an embodiment, the system may perform a fine grain analysis following the cluster analysis (Operation 908). Any target system(s) that are associated with a drift or potential drift by the cluster analysis may be the focus of a fine grain evaluation. While performing a fine grain analysis, the system may consider additional information that is excluded from the metric sets that were the basis for the initial cluster analysis. In an example, the fine grain evaluation entails a detailed comparison between a potentially drifting target system and another target system that is deemed to conform with a target state. In this example, the system compares the two target systems based on a more comprehensive dataset that is generated for each target system. In another example, the fine grain evaluation entails (a) clustering another set of vectors that are generated based on a more comprehensive data corpus for a smaller set of target systems and (b) analyzing the clusters for additional indications of drift.

Note that performing an initial cluster analysis followed by a fine grain analysis may be advantageous in certain applications. For instance, performing an initial cluster analysis followed by a fine grain analysis may be advantageous if it is impractical to consider detailed information regarding each target system during the initial cluster analysis. In an example, it is impractical to consider detailed information regarding each target system due to a large number of target systems needing to be canvased for drift. In another example, it is impractical to consider detailed information regarding each target system because the detailed information for each target system might contain a significant amount of sensitive information that the system is generally prohibited from harvesting when no signs of issues are present.

In an embodiment, the system presents the results of the drift detection process to a user (Operation 910). The system presents the results of the drift detection process to a user via an interface or another medium. In an example, the results of the drift detection process may identify target systems experiencing drift, resources within target systems that are associated with drifts, symptoms of drifts, potential causes of drift, suggested actions for remediating drift, and/or other information. Additionally, or alternatively, the system performs operations for actively remediating drift. In an example, the system reverts a target system experiencing a drift to a former configuration of the target system. In another example, the system alters the configuration of a target system to match the configuration of another target system having a preferred state.

In some applications, the system utilizes a generative AI model to presents the results of the drift detection process to a user. For instance, a generative AI model may be prompted to formulate a natural language communication that can be directed to a user. Furthermore, a generative AI model may be prompted to formulate a visualization (e.g., a graph, chart, diagram, etc.) that can be displayed to a user.

6. Machine Learning for Drift Detection

FIG. 10 illustrates an example set of operations for incorporating machine learning into a drift detection process in accordance with one or more embodiments. One or more operations illustrated in FIG. 10 may be modified, rearranged, or omitted. Accordingly, the particular sequence of operations illustrated in FIG. 10 should not be construed as limiting the scope of one or more embodiments.

In an embodiment, the system trains a machine learning model to identify metrics that are relevant to a drift detection process (Operation 1002). More specifically, a machine learning algorithm trains the machine learning model with training data. The machine learning algorithm performs an iterative process of feeding the training data to the machine learning model and adjusting the machine learning model's internal parameters to optimize the machine learning model's ability to identify patterns and relationships in the training data. A set of training data defines an association between (a) a circumstance of a drift detection process and (b) a set of metric(s) that may be relevant if the circumstance exists. For instance, an example set of training data defines an association between (a) a particular user characteristic and (b) a set of metrics that tend to be of interest to users having the particular user characteristic. Another example set of training data defines an association between (a) a particular type of target system and (b) metrics that tend to reveal drift in the particular type of target system. Yet another example set of training data defines an association between (a) a particular issue associated with a target system and (b) a set of metrics that are relevant to detecting types of drift that are known to cause the particular issue.

In some applications, the training data includes historical data from prior drift detection processes. For instance, an example set of training data may be derived from (a) user input indicating an issue that was being experienced by a user and (b) a set of metrics that revealed a drift causing the issue.

In an embodiment, the system applies a trained machine learning model to identify metrics that are relevant to a drift detection process (Operation 1004). The trained machine learning model may select relevant metrics based on various inputs. Examples inputs that may be a basis for metric selection include attributes of target systems, characteristics of relevant users, historical data, user input, and/or other information. Based on the inputs, the machine learning model selects one or more metrics that are deemed more likely to be significant for detecting drift in the present circumstances.

In some applications, the machine learning model is configured to assign differing levels of significance to different metrics. For example, the system may assign a level of significance to (a) each metric defined by a general specification and/or (b) other metrics that are not included in the general specification.

In an embodiment, the system generates a custom specification (Operation 1006). The system generates the custom specification based on the output of the machine learning model and/or other information. In an example, the custom specification calls for scaling to be applied to the metrics selected by the machine learning model. In this example, the custom specification may dictate that different amounts of weight are added to different metrics according to relative levels of significance that have been assigned to the differing metrics by the machine learning model. The custom specification may also call for weight to be removed from other metrics that the machine learning model deemed to be of lesser relevance in this example. In another example, the custom specification calls for a metric to be included in the metric sets as a result of the machine learning model identifying the particular metric as relevant to the drift detection process. In yet another example, the custom specification calls for the removal of a subset of metrics in the metric sets that the machine learning model deemed to be irrelevant to the present drift detection process.

In an embodiment, the system determines if feedback has been obtained and proceeds to another operation based on the determination (Operation 1008). If the system has obtained new feedback that pertains to an application of the machine learning model (YES in Operation 1008), the system proceeds to Operation 1010. Alternatively, if the system does not obtain feedback pertaining to an application of the machine learning model (NO in Operation 1008), the system returns to Operation 1004. The system may obtain feedback by generating the feedback independently, by receiving the feedback from a user, and/or by other means. The system collects feedback passively (e.g., receiving feedback unprompted from a user), and/or the system collects feedback actively (e.g., by prompting a user for feedback).

In an embodiment, the system updates the machine learning model(s) based on the newly obtained feedback (Operation 1010). To this end, the system analyzes the feedback and generates additional training data based on the feedback. The system analyzes feedback using a process of assimilating new data patterns, user interactions, and error trends into a data repository of the system. The system uses this information to identify shifts in data trends or emergent patterns that were not present or were inadequately represented in the original training data. Based on this analysis, the system initiates a retraining or updating cycle for the machine learning model. If feedback suggests minor deviations or incremental changes in data patterns, incremental learning strategies are employed to retrain the machine learning model. Incremental learning strategies are used for fine-tuning the machine learning model with the new data while retaining the machine learning model's previously learned knowledge. If feedback indicates significant shifts or the emergence of new patterns, a more comprehensive model updating process is initiated. This process might involve revisiting a machine learning model selection process, re-evaluating the suitability of the current model architecture, and/or potentially exploring alternative models or configurations that are more attuned to the new data. The system tracks changes, modifications, and/or the evolution of the machine learning model as result of further training based on feedback. Tracking changes, modifications, and evolution of the machine learning model facilitates transparency into the integration of feedback and enables the machine learning model to be rolled back to a previous state if appropriate.

7. Example Embodiment

A detailed example is described below for purposes of clarity. Components and/or operations described below should be understood as one specific example which may not be applicable to certain embodiments. One or more components and/or operations may be modified, rearranged, or omitted all together. Accordingly, components and/or operations described below should not be construed as limiting the scope of any of the claims.

7.1 Example Drift Detection Architecture

Figure 11:
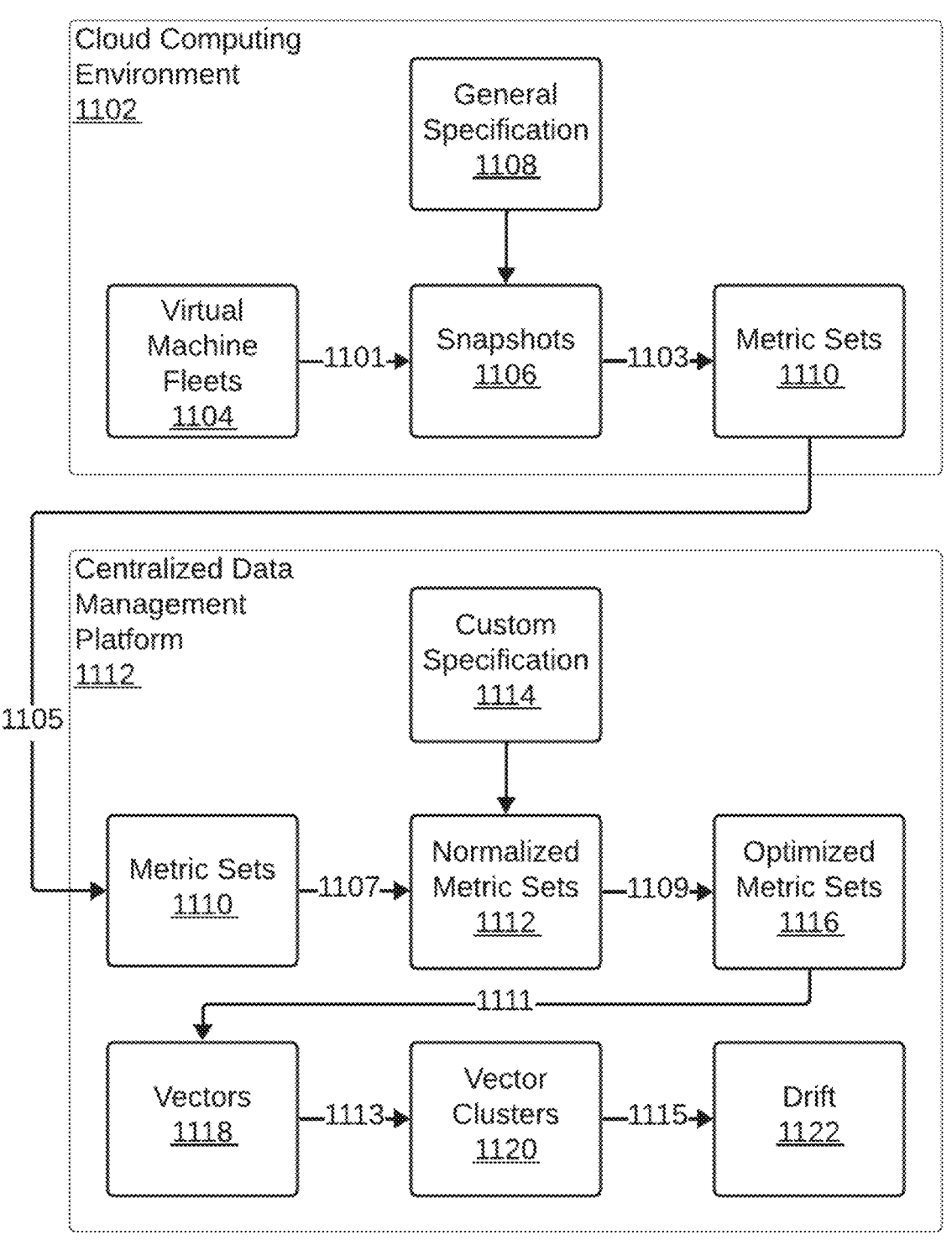
FIG. 11 illustrates an example architecture for detecting drift in accordance with one or more embodiments.

FIG. 11 illustrates an architecture 600 for detecting drift in cloud computing environment 1102 in accordance with an example embodiment. Cloud computing environment 1102 is associated with a cloud user that operates virtual machine fleet 1104. The virtual machines of the virtual machine fleet 1104 are managed as a unit by the cloud user. While the virtual machine fleet 1104 is managed solely by the cloud user, lower-level resources that support the virtual machine fleet 1104 (e.g., hypervisor, hardware hosts for the virtual machines, etc.) are managed by a cloud provider. In this example, a target system includes a virtual machine of the virtual machine fleet 1104, resources that support the operation of the virtual machine, and resources that run on the virtual machine. For the purposes of this example, assume a change to virtual machine fleet 1104 by the cloud user results in a drift that is associated with the virtual machine fleet 1104, and further assume that a drift detection process involving the virtual machine fleet 1104 is initiated.

In an embodiment, the system generates snapshots 1106 to collect state information for the drift detection process (Operation 1101). The system generates the snapshots 1106 within cloud computing environment 1102. The snapshots 1106 capture state information associated with virtual machine fleet 1104. In particular, each snapshot 1106 captures state information detailing (a) a virtual machine in the virtual machine fleet 1004, (b) resources that support the virtual machine, (c) resources that run on the virtual machine, and/or (d) resources that otherwise interact with the virtual machine. Not all of the information captured by the snapshots 1106 is relevant to detecting the drift associated with the virtual machine fleet 1104. At least a portion of the information captured by the snapshots 1106 is sensitive information of the cloud user. Note that data representing the cause of a drift may itself be sensitive information.

In an embodiment, the system generates metric sets 1110 based on (a) the snapshots 1106 and (b) a general specification 1108 (Operation 1103). The general specification 1108 defines metrics that are relevant to detecting drift associated with the virtual machine fleet 1104. The system generates a metric set 1110 for each virtual machine in the virtual machine fleet 1104. Each metric set 1110 contains the same type and number of metrics. The metric sets 1110 indicate how resources are configured, how resources are allocated, how resources are utilized, and/or other information. The metrics sets 1110 represent both quantitative attributes and qualitative attributes. Sensitive information is represented in metric sets 1110 using numerical hashes. An example metric set 1110 represents the state of (a) a virtual machine in the virtual machine fleet 1104, (b) lower-level resources that support the virtual machine, (c) higher-level resources that run on the virtual machine, and/or (d) resources that otherwise interact with the virtual machine. In this example, each metric set 1110 includes multiple categories of metrics. Additional embodiments and/or examples relating machine learning techniques for generating a custom specification are described below in Section 7.2, titled "Example Metric Set."

In an embodiment, the system extracts the metric sets 1110 from the cloud computing environment 1102, and the system collects the metric sets 1110 in a centralized data management platform 1112 (Operation 1105). The representation of sensitive information in the metric sets 1110 using hashes enables the system to extract the metric sets 1110 from the cloud computing environment 1102. Extracting the metric sets 1110 from the cloud computing environment 1102 enables the system to further process the metric sets 1110 without burdening computing resources of the cloud computing environment 1102 that are intended for processes of the cloud user. Furthermore, performing a drift analysis within centralized management platform 1112 may enable the system to consider information that would otherwise be excluded from the analysis. For instance, performing a drift analysis within centralized management platform 1112 may enable the system to consider state information associated with other cloud computing systems of other cloud users.

In an embodiment, the system normalizes metrics in the metric sets 1110 to generate normalized metric sets 1112 (Operation 1107). For instance, any given value in a metric sets 1110 is normalized to a value that is (a) equal to or greater than –1 and (b) equal to or less than 1. The system normalizes numerical statistics, and/or the system normalizes hash values.

In an embodiment, the system applies a custom specification 1114 to normalized metric sets 1112 to generate optimized metric sets 1116 (Operation 1109). In particular, the system applies scaling to a subset of the metrics within each metric sets 1110. The system applies scaling to the same metrics in each metric set 1110. The scaled metrics 1110 correspond to metrics that the system has deemed are likely to be especially relevant to a forthcoming drift analysis.

In an embodiment, the system converts optimized metric sets 1116 to vectors 1118 (Operation 1111). The vectors 1118 are fixed-length vectors having flattened dimensions. The system generates a single vector 1118 based on an optimized metric set 1116, or the system generates multiple vectors 1118 based on the optimized metric set 1116. Each metric in an optimized metric set 1116 corresponds to a dimension of a vector 1118.

In an embodiment, the system groups the vectors 1118 into vector clusters 1120 (Operation 1113). For the purposes of this example, assume the system applies a k-means algorithm for clustering. When applying the k-means algorithm, the system initially determines a number of clusters (i.e., the value of k) that will be generated by the algorithm. In general, the number of clusters that the system selects will vary based on the application. In some cases, the system may select the number of clusters based on an elbow method, a silhouette analysis, a gap statistic, an Akaike information criterion, a Bayesian information criterion, and/or other analyses. Once the number of clusters has been decided, the system selects an equivalent number of initial vectors. The centroids of initial vectors will serve as the initial centroids of the clusters. The system then begins to assign each of the remaining vectors to one of the clusters. For each remaining vector, the system calculates the Euclidean distances between the vector's centroid and the centroids of the clusters. The system assigns the vector to the cluster having the centroid that is nearest to the vector's centroid. Having assigned the vector to the cluster, the system then recalculates the centroid of at least that cluster. Once the new centroid(s) have been calculated, the system moves on to the next vector awaiting assignment to a cluster.

In an embodiment, the system identifies drift 1122 associated with virtual machine fleet 1104 based on analyzing the vectors clusters 1120 (Operation 1115). In particular, the system may identify the drift 1122 based on the analysis of the vector clusters 1120 revealing irregular resource configuration, irregular resource allocation, irregular resource utilization, and/or other characteristics of drift 1122. The system identifies a single virtual machine in virtual machine fleet 1104 that is impacted by drift 1122, or the system identifies multiple virtual machines in virtual machine fleet 1104 that are impacted by drift 1122. The system may identify a particular target system impacted by drift 1122 based on inconsistency between a vector 1118 representing the particular target system and other vectors 1118 in the same vector cluster 1120. Additionally, or alternatively, the system may identify multiple target systems impacted by drift 1122 based on vectors 1118 representing the multiple target systems displaying a shared pattern of irregularity.

Drift 1122 may be characterized by inconsistent resource configuration. For example, while analyzing the vector clusters 1120, the system may determine that the kernel version is not consistent across the virtual machine fleet 1104. In another example, database applications and pluggable database applications run on the virtual machine fleet 1104. In this example, the system identifies one or more databases have inconsistent database parameters. In another example, the system identifies an inconsistency in the configuration of the operating systems that the virtual machines of the virtual machine 1104 fleet run on.

Drift 1122 may be characterized by inconsistent resource allocation. In an example, the system determines that there is an inconsistency in the number of CPUs that that are being allocated to the virtual machines. In another example, the system identifies one or more virtual machines having an inconsistent storage allocation ratio.

Drift 1122 may be characterized by inconsistent resource utilization. For example, while analyzing the vector clusters 1120, the system may identify a virtual machine that is using a disproportionate amount of processing resources and/or storages resources. In another example, the system determines that the performance of one virtual machine is much poorer than the other virtual machines in the virtual machine fleet 1104.

7.2 Example Metric Set

Figure 12:
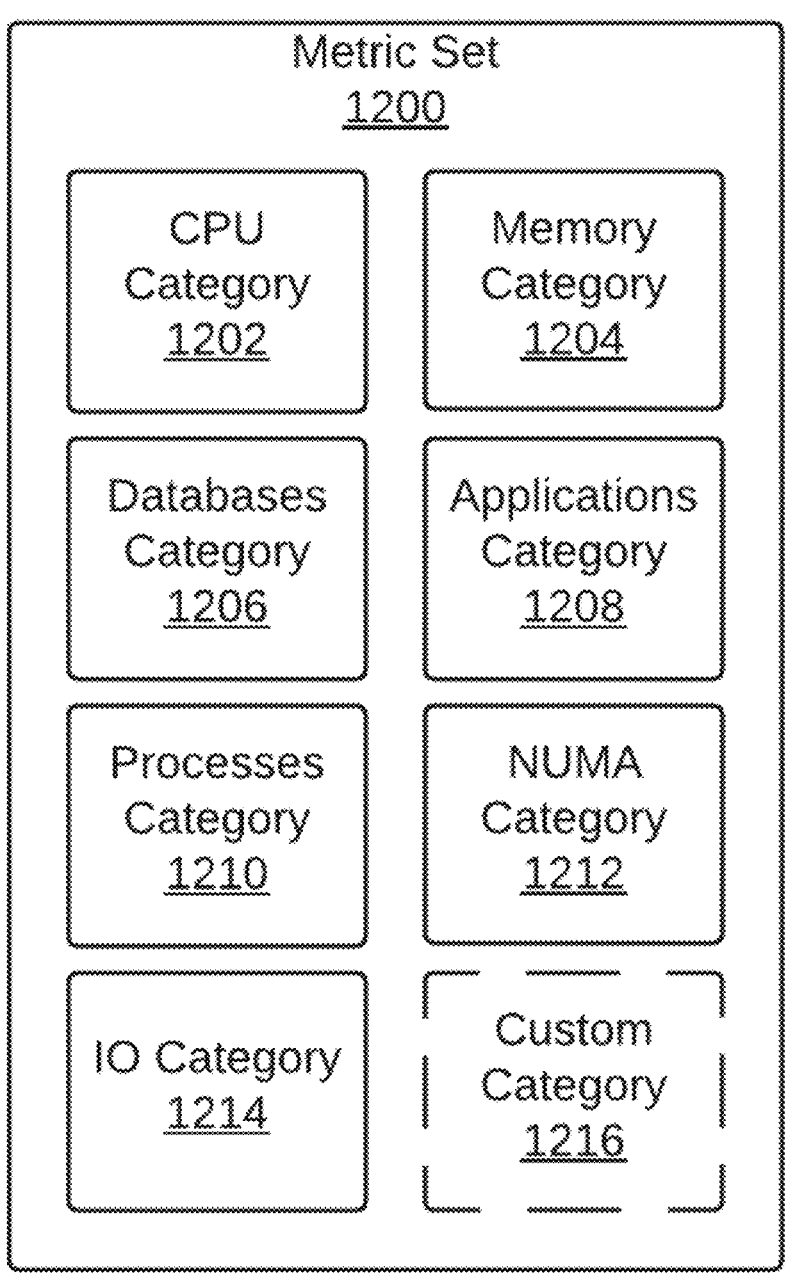
FIG. 12 illustrates an example metric set in accordance with one or more embodiments.

FIG. 12 is a block diagram illustrating a metric set 1200 according to an example embodiment. As illustrated in FIG. 12, metric set 1200 includes multiple categories of metrics. In particular, metric set 1200 includes a CPU category 1202, a memory category 1204, a databases category 1206, an applications category 1208, a processes category 1210, a NUMA category 1212, an IO category 1214, a custom category 1216, and/or other categories.

In an embodiment, metric set 1200 includes a CPU category 1202. The CPU category 1200 includes but is not limited to a CPU count metric, a CPU core count metric, a CPU socket count metric, a CPU model hash metric, a CPU usage percentage metric, a CPU usage user percentage metric, a CPU usage category deviation metric, a CPU usage deviation metric, and/or other metrics.

In an embodiment, metric set 1200 includes but is not limited to a memory category 1204. The memory category 1204 includes a memory total metric, a memory free metric, a memory available metric, a swap total metric, a swap free metric, a huge page memory total metric, a huge page memory free metric, and/or other metrics.

In an embodiment, metric set 1200 includes but is not limited to a databases category 1206. The databases category includes a container database (CDB) count metric, a pluggable database (PDB) count metric, a PDB density metric, a PDB density deviation metric, a PDB count hash metric, an instance version hash metric, an instance version full hash metric, an instance status hash metric, an instance mode regular count metric, an instance role hash metric, an instance enterprise edition percentage metric, a database status hash metric, a CDB CPU count total metric, a CDB CPU count hash metric, a PDB CPU count total metric, a PDB CPU count instance hash metric, a PDB CPU count instance hash metric, a PDB CPU count hash metric, a PDB CPU auto scale percentage metric, a SGA (shared global area) max size total metric, an SGA max size hash metric, an SGA target total metric, an SGA target hash metric, a buffer cache size total metric, a shared pool size total metric, a large pool size total metric, a PGA (program global area) aggregate target total metric, a PGA aggregate target hash metric, a PGA memory allocated metric, a PGA memory used metric, a CDB processes count metric, a CDB process density metric, a CDB foreground process percentage, an active sessions total metric, an active sessions percentage metric, a tablespaces count metric, a datafiles count metric, a log files count metric, a CDB parameter configuration hash metric, an automatic storage management (ASM) CPU count total metric, an ASM CPU count hash metric, and/or other metrics.

In an embodiment, metric set 1200 includes but is not limited to an applications category 1208. The applications category 1208 includes an applications count metric, an application process count hash metric, an application process count deviation metric, an application CPU usage deviation metric, and/or other metrics.

In an embodiment, metric set 1200 includes but is not limited to a processes category 1210. The processes category 1210 includes a process count metric, a process real time count metric, a process density metric, a 1 minute load average metric, a 5 minute load average metric, a 15 minute load average metric, a 1 minute load average percentage metric, a 5 minute load average percentage metric, a 15 minute load average percentage metric, a database process percentage metric, and/or other metrics.

In an embodiment, metric set 1200 includes but is not limited to a non-uniform memory access (NUMA) category 1212. The NUMA category 1212 includes a NUMA nodes metric, a NUMA node CPU core count metric, a NUMA node memory size metric, a NUMA node huge page memory size metric, and/or other metrics.

In an embodiment, metric set 1200 includes but is not limited to an IO (input output) category 1214. The IO category 1214 includes an IO devices metric and/or other metrics.

In an embodiment, metric set 1200 may include a custom category 1216. The custom category 1216 contains any custom metrics that are defined by the system and/or a user for a drift detection process.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form in which such claims issue, including any subsequent correction.

What is claimed is:

1. One or more non-transitory computer-readable media comprising instructions that, when executed by one or more hardware processors, cause performance of operations comprising:

generating a first plurality of snapshots comprising state information of a set of target systems, the set of target systems comprising one or more target systems, wherein the first plurality of snapshots comprises at least one of: (a) a second plurality of snapshots that represents a respective plurality of target systems or (b) a third plurality of snapshots that represents a particular target system at a respective plurality of points in time;

based, at least in part, on the first plurality of snapshots, generating a plurality of metric sets according to a first specification, wherein the first specification defines a plurality of metrics for drift detection;

based, at least in part, on a feature set, modifying the plurality of metric sets to generate a modified plurality of metric sets, wherein modifying the plurality of metric sets comprises at least one of: (a) adding weight to a first metric comprised within a first metric set, (b) removing weight from a second metric comprised within the first metric set, (c) adding a third metric to the first metric set, or (d) removing a fourth metric from the first metric set; and based, at least in part, on the modified plurality of metric sets, detecting a drift associated with the set of target systems.

2. The one or more non-transitory computer-readable media of claim 1, wherein the set of target systems comprises a first target system that corresponds to the first metric set; wherein the drift impacts the first target system; wherein the first target system comprises a first hierarchy of resources; wherein the first metric set indicates a first state of the first hierarchy of resources; and wherein the drift is characterized by at least one of (a) an abnormally configured resource comprised within the first hierarchy of resources, (b) an abnormally allocated resource comprised within the first hierarchy of resources, or (c) an abnormally utilized resource comprised within the first hierarchy of resources.

3. The one or more non-transitory computer-readable media of claim 1, wherein generating the modified plurality of metric sets comprises:

determining a first dataset based on a first snapshot of a first target system, the first dataset comprising sensitive information associated with the first target system, wherein removing the sensitive information from a first computing environment comprising the first target system is prohibited;

applying one or more hashing algorithms to the first dataset to generate a first hash, wherein the first metric set (a) represents the first target system and (b) comprises the first hash;

aggregating the plurality of metric sets, the plurality of metric sets comprising the first metric set, wherein aggregating the plurality of metric sets comprises transmitting the first metric set from the first computing environment to a second computing environment.

4. The one or more non-transitory computer-readable media of claim 1, wherein detecting the drift associated with the set of target systems comprises:

normalizing values comprised within the plurality of metric sets;

generating a plurality of vectors based, at least in part, on the values comprised within the plurality of metric sets;

applying one or more clustering algorithms to the plurality of vectors to generate a set of clusters, the set of clusters comprising one or more clusters; and analyzing the set of clusters to detect the drift associated with the set of target systems.

5. The one or more non-transitory computer-readable media of claim 1, wherein the feature set comprises at least one of: (a) an attribute of a target system; (b) a first user characteristic of a first user associated with the target system; (c) a second user characteristic of a second user that initiates an ongoing drift detection process; (d) a first set of historical data pertaining to the set of target systems; (d) a second set of historical data pertaining to one or more prior drift detection processes; (e) a type of drift potentially associated with the set of target systems; (f) user input; (g) a feature derived from applying natural language processing to a natural language input; or (f) information comprised within the plurality of metric sets.

6. The one or more non-transitory computer-readable media of claim 1, wherein the operations further comprise:

prior to modifying the plurality of metric sets:

based, at least in part, on the feature set, generating a second specification, the second specification defining one or more modifications to the plurality of metric sets, wherein generating the second specification comprises:

applying a machine learning model to the feature set to select one or more metrics that are relevant to detecting one or more drifts that are potentially associated with the set of target systems, wherein the one or more modifications defined by the second specification are determined based, at least in part, on the machine learning model selecting the one or more metrics;

wherein the plurality of metric sets is modified according to the second specification.

7. The one or more non-transitory computer-readable media of claim 6, wherein the operations further comprise:

prior to generating the second specification:

accessing training data, the training data comprising a first set of training data, wherein the first set of training data defines an association between (a) a first feature of a first drift detection process and (b) a first set of one or more metrics that are relevant to detecting drift if the first feature exists;

training the machine learning model to select metrics relevant to drift detection based, at least in part, on the training data;

subsequent to generating the second specification:

accessing feedback pertaining to the second specification; and further training the machine learning model based, at least in part, on the feedback.

8. The one or more non-transitory computer-readable media of claim 1, wherein subsequent to detecting the drift the operations further comprise at least one of:

(a) performing a fine-grain drift analysis involving a subset of target systems comprised within the set of target systems, the subset of target systems comprising a first target system and a second target system, wherein the first target system is impacted by the drift and the second target system conforms to a target state;

(b) alerting a user to the drift by presenting a communication to the user, the communication comprising at least one of: (a) an identification of the first target system, (b) a cause of the drift, or (c) one or more suggested operations for remediating the drift; or (c) converting the first target system from a present state to at least one of: (a) a previous state of the first target system or (b) the target state.

9. The one or more non-transitory computer-readable media of claim 2, wherein the first target system is a cloud computing system that is cooperatively managed by a plurality of entities, wherein the plurality of entities comprises a cloud user and a cloud provider; wherein the cloud user manages a first subset of higher-level resources comprised within the first hierarchy of resources; wherein the cloud provider manages a second subset of lower-level resources comprised within the first hierarchy of resources; wherein the first metric set represents both (a) quantitative attributes of the first target system and (b) qualitative attributes of the first target system; wherein the quantitative attributes of the first target system are represented by numerical values comprised within the first metric set; and wherein the qualitative attributes of the first target system are represented by numerical digital signatures comprised within the first metric set.

10. A method comprising:

generating a first plurality of snapshots comprising state information of a set of target systems, the set of target systems comprising one or more target systems, wherein the first plurality of snapshots comprises at least one of: (a) a second plurality of snapshots that represents a respective plurality of target systems or (b) a third plurality of snapshots that represents a particular target system at a respective plurality of points in time;

based, at least in part, on the first plurality of snapshots, generating a plurality of metric sets according to a first specification, wherein the first specification defines a plurality of metrics for drift detection based, at least in part, on a feature set, modifying the plurality of metric sets to generate a modified plurality of metric sets, wherein modifying the plurality of metric sets comprises at least one of: (a) adding weight to a first metric comprised within a first metric set, (b) removing weight from a second metric comprised within the first metric set, (c) adding a third metric to the first metric set, or (d) removing a fourth metric from the first metric set; and based, at least in part, on the modified plurality of metric sets, detecting a drift associated with the set of target systems, wherein the method is performed by at least one device including a hardware processor.

11. The method of claim 10, wherein the set of target systems comprises a first target system that corresponds to the first metric set; wherein the drift impacts the first target system; wherein the first target system comprises a first hierarchy of resources; wherein the first metric set indicates a first state of the first hierarchy of resources; and wherein the drift is characterized by at least one of (a) an abnormally configured resource comprised within the first hierarchy of resources, (b) an abnormally allocated resource comprised within the first hierarchy of resources, or (c) an abnormally utilized resource comprised within the first hierarchy of resources.

12. The method of claim 10, wherein generating the modified plurality of metric sets comprises:

determining a first dataset based on a first snapshot of a first target system, the first dataset comprising sensitive information associated with the first target system, wherein removing the sensitive information from a first computing environment comprising the first target system is prohibited;

applying one or more hashing algorithms to the first dataset to generate a first hash, wherein the first metric set (a) represents the first target system and (b) comprises the first hash;

aggregating the plurality of metric sets, the plurality of metric sets comprising the first metric set, wherein aggregating the plurality of metric sets comprises transmitting the first metric set from the first computing environment to a second computing environment.

13. The method of claim 10, wherein detecting the drift associated with the set of target systems comprises:

normalizing values comprised within the plurality of metric sets;

generating a plurality of vectors based, at least in part, on the values comprised within the plurality of metric sets;

applying one or more clustering algorithms to the plurality of vectors to generate a set of clusters, the set of clusters comprising one or more clusters; and analyzing the set of clusters to detect the drift associated with the set of target systems.

14. The method of claim 10, wherein the feature set comprises at least one of: (a) an attribute of a target system; (b) a first user characteristic of a first user associated with the target system; (c) a second user characteristic of a second user that initiates an ongoing drift detection process; (d) a first set of historical data pertaining to the set of target systems; (d) a second set of historical data pertaining to one or more prior drift detection processes; (e) a type of drift potentially associated with the set of target systems; (f) user input; (g) a feature derived from applying natural language processing to a natural language input; or (f) information comprised within the plurality of metric sets.

15. The method of claim 10, further comprising:

prior to modifying the plurality of metric sets:

based, at least in part, on the feature set, generating a second specification, the second specification defining one or more modifications to the plurality of metric sets, wherein generating the second specification comprises:

applying a machine learning model to the feature set to select one or more metrics that are relevant to detecting one or more drifts that are potentially associated with the set of target systems, wherein the one or more modifications defined by the second specification are determined based, at least in part, on the machine learning model selecting the one or more metrics;

wherein the plurality of metric sets is modified according to the second specification.

16. The method of claim 15, further comprising:

prior to generating the second specification:

accessing training data, the training data comprising a first set of training data, wherein the first set of training data defines an association between (a) a first feature of a first drift detection process and (b) a first set of one or more metrics that are relevant to detecting drift if the first feature exists;

training the machine learning model to select metrics relevant to drift detection based, at least in part, on the training data;

subsequent to generating the second specification:

accessing feedback pertaining to the second specification; and further training the machine learning model based, at least in part, on the feedback.

17. The method of claim 10, further comprising:

subsequent to detecting the drift, performing at least one of:

(a) performing a fine-grain drift analysis involving a subset of target systems comprised within the set of target systems, the subset of target systems comprising a first target system and a second target system, wherein the first target system is impacted by the drift and the second target system conforms to a target state;

(b) alerting a user to the drift by presenting a communication to the user, the communication comprising at least one of: (a) an identification of the first target system, (b) a cause of the drift, or (c) one or more suggested operations for remediating the drift; or (c) converting the first target system from a present state to at least one of: (a) a previous state of the first target system or (b) the target state.

18. The method of claim 11, wherein the first target system is a cloud computing system that is cooperatively managed by a plurality of entities, wherein the plurality of entities comprises a cloud user and a cloud provider; wherein the cloud user manages a first subset of higher-level resources comprised within the first hierarchy of resources; wherein the cloud provider manages a second subset of lower-level resources comprised within the first hierarchy of resources; wherein the first metric set represents both (a) quantitative attributes of the first target system and (b)

qualitative attributes of the first target system; wherein the quantitative attributes of the first target system are represented by numerical values comprised within the first metric set; and wherein the qualitative attributes of the first target system are represented by numerical digital signatures comprised within the first metric set.

19. A system comprising:

at least one device including a hardware processor;

the system being configured to perform operations comprising:

generating a first plurality of snapshots comprising state information of a set of target systems, the set of target systems comprising one or more target systems, wherein the first plurality of snapshots comprises at least one of: (a) a second plurality of snapshots that represents a respective plurality of target systems or (b) a third plurality of snapshots that represents a particular target system at a respective plurality of points in time;

based, at least in part, on the first plurality of snapshots, generating a plurality of metric sets according to a first specification, wherein the first specification defines a plurality of metrics for drift detection based, at least in part, on a feature set, modifying the plurality of metric sets to generate a modified plurality of metric sets, wherein modifying the plurality of metric sets comprises at least one of: (a) adding weight to a first metric comprised within a first metric set, (b) removing weight from a second metric comprised within the first metric set, (c) adding a third metric to the first metric set, or (d) removing a fourth metric from the first metric set; and based, at least in part, on the modified plurality of metric sets, detecting a drift associated with the set of target systems.

20. The system of claim 19, wherein the set of target systems comprises a first target system that corresponds to the first metric set; wherein the drift impacts the first target system; wherein the first target system comprises a first hierarchy of resources; wherein the first metric set indicates a first state of the first hierarchy of resources; and wherein the drift is characterized by at least one of (a) an abnormally configured resource comprised within the first hierarchy of resources, (b) an abnormally allocated resource comprised within the first hierarchy of resources, or (c) an abnormally utilized resource comprised within the first hierarchy of resources.

* * * * *